United States Patent
Allen

(10) Patent No.: US 12,307,246 B2
(45) Date of Patent: May 20, 2025

(54) UPGRADE INFRASTRUCTURE WITH INTEGRATION POINTS

(71) Applicant: Dell Products L.P., Hopkinton, MA (US)

(72) Inventor: Patricia Lee Allen, Hollis, NH (US)

(73) Assignee: Dell Products L.P., Hopkinton, MA (US)

( * ) Notice: Subject to any disclaimer, the term of this patent is extended or adjusted under 35 U.S.C. 154(b) by 194 days.

(21) Appl. No.: 18/356,758

(22) Filed: Jul. 21, 2023

(65) Prior Publication Data
US 2025/0028525 A1    Jan. 23, 2025

(51) Int. Cl.
G06F 9/44    (2018.01)
G06F 8/65    (2018.01)
G06F 8/71    (2018.01)

(52) U.S. Cl.
CPC . *G06F 8/71* (2013.01); *G06F 8/65* (2013.01)

(58) Field of Classification Search
CPC ........................................................ G06F 8/71
USPC ........................................................ 717/121
See application file for complete search history.

(56) References Cited

U.S. PATENT DOCUMENTS 9,342,291 B1 *   5/2016   Guo .......................... G06F 8/65
12,210,895 B2 *  1/2025   Kaimal ............... H04L 41/0893

OTHER PUBLICATIONS

U.S. Appl. No. 17/502,094, filed Oct. 15, 2021, entitled Upgrade Infrastucture With Integration Points, to Patricia Lee Allen, et al.
U.S. Appl. No. 17/506,196, filed Oct. 20, 2021, entitled Upgrade Infrastucture With Integration Points, to Patricia Lee Allen, et al.
U.S. Appl. No. 17/970,996, filed Oct. 21, 2022, entitled Upgrade Infrastructure With Integration Points Having Dynamically Determined Callbacks, to Patricia Lee Allen.
U.S. Appl. No. 17/364,927, filed Jul. 1, 2021, entitled Meta Data Driven Upgrades, to Alex Kulakovsky, et al.

* cited by examiner

*Primary Examiner* — Evral E Bodden
(74) *Attorney, Agent, or Firm* — Muirhead and Saturnelli, LLC

(57) ABSTRACT

Upgrading a cluster can include: defining integration points associated with workflow processing points of an upgrade workflow; associating a code entity with an integration point; and performing processing that executes the upgrade workflow to upgrade storage appliances, wherein first and second software clusters are installed on the storage appliances, wherein upgrading the storage appliances includes upgrading the first and second software clusters, wherein the processing includes: prior to upgrading a first storage appliance, executing first code corresponding to the integration point; in response to executing the first code, invoking the code entity to perform a first task in connection with the second cluster software prior to upgrading the first storage appliance; and upgrading the first storage appliance including upgrading a first component of the first software cluster and upgrading a second component of the second software cluster, wherein the first and second components are installed on the first storage appliance.

20 Claims, 13 Drawing Sheets

1102 — Appliance A2 rollback is successful. A2 rollback can include rolling back versions of multiple software clusters including the base system and NAS cluster software on A2 from V2 to V1.

1104 — After a successful A2 rollback, execute callback(s) associated with IP 2D for A2. IP 2D callbacks can be invoked and can execute on the primary appliance A1 which can issue commands to A2 to perform IP 2D processing on A2. The IP 2D callbacks for A2 can perform processing including locating the appliance on which the NAS cluster manager is executing, and then issuing a set of one or more commands or messages to the NAS cluster manager. If the NAS cluster manager is not on A1, locating the appliance on which the NAS cluster manager is executing can be performed by A1 issuing commands or queries to one or more of the secondary appliances inquiring whether the NAS cluster manager is located on the secondary appliances. A first of the queried secondary appliances upon which the NAS cluster manager executes can send a reply to A1 indicating that the NAS cluster manager executes on the first appliance. Subsequently, A1 can issue the set of one or more commands or messages to the NAS cluster manager on the first appliance. The set of one or more commands or messages can, for example, send first information to the NAS cluster manager, where the first information can notify the NAS cluster manager that secondary appliance A2 has been successfully rolled back. In response, the NAS cluster manager can perform any desired processing such as, for example, set and persist appropriate NAS cluster state information based, at least in part, on the first information.

In at least one embodiment, an IP 2D callback for A2 can include sending a first request to the NAS cluster manager to prepare for a NAS cluster rollback due to the A2 rollback. In response to the first request, the NAS cluster manager can: set the NAS cluster into a NAS cluster rollback mode; restore VDMs from the second node of A2 back to the rolled back first node of A2 (e.g., these VDMs were previously moved from the first node to the second node of A2 when the upgrade to the first node of A2 started, and now the VDMs are restored to the first node from the second node to restore node-level load balance); and restrict or limit NAS requests/operations performed on A2 (e.g., reject any NAS requests/operations unrelated to rollback tasks or work).

After sending the first request, the IP 2D callback for A2 can also include: sending a second request to the NAS cluster manager to stop the NAS application on the first node of A2 that rolled back; and sending a third request to the NAS cluster manager to restart the NAS application on the first node of A2 in the prior V1 version of NAS cluster software (e.g., where V1 is the rolled back version).

FIG. 13

UPGRADE INFRASTRUCTURE WITH INTEGRATION POINTS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, which are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems typically do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system includes one or more processors, and a memory comprising code that, when executed, performs the method. The non-transitory computer readable medium includes code stored thereon that, when executed, performs the method. The method can comprise: defining a plurality of integration points, wherein each of the plurality of integration points is associated with one of a first plurality of workflow processing points included in an upgrade workflow, wherein the upgrade workflow includes a second plurality of workflow processing points comprising the first plurality of workflow processing points; associating a first code entity with a first of the plurality of integration points; and performing first processing that executes the upgrade workflow to upgrade a plurality of storage appliances, wherein a first software cluster of components is installed on the plurality of storage appliances and wherein a second software cluster of components is installed on the plurality of storage appliances, wherein upgrading the plurality of storage appliances by the first processing includes upgrading the first software cluster of components installed on the plurality of storage appliances from a first current version to a first new version, and upgrading the second software cluster of components installed on the plurality of appliances from a second current version to a second new version, wherein the first processing further includes: prior to upgrading a first of the plurality of storage appliances, executing first code corresponding to the first integration point; in response to executing the first code corresponding to the first integration point, invoking the first code entity associated with the first integration point, wherein said first code entity performs at least a first task in connection with the second cluster software prior to upgrading the first storage appliance; and performing said upgrading the first storage appliance including upgrading a first component of the first software cluster from the first current version to the first new version and upgrading a second component of the second software cluster from the second current version to the second new version, wherein the first component and the second component are installed on the first storage appliance.

In at least one embodiment, the first software cluster can be a base system software cluster, and the second software cluster can be a NAS (network attached storage) software cluster. The second component of the NAS software cluster can be a first file server. The first component of the base system software cluster can perform block storage services used by the first file server of the NAS software cluster. The NAS software cluster can include a NAS cluster manager executing on a second of the plurality of storage appliances and wherein the base system software cluster can include a base system cluster manager executing on a third of the plurality of storage appliances. The first task performed by the first code entity at the first integration point prior to upgrading the first storage appliance can include determining which of the plurality of storage appliances includes the NAS cluster manager executing thereon. Determining which of the plurality of storage appliances includes the NAS cluster manager executing thereon can include: the base system cluster manager querying one or more of the plurality of storage appliances as to whether the NAS cluster manager is executing on the one or more storage appliances, wherein the one or more storage appliances queried includes the second storage appliance; and the second storage appliance sending a first response to the base system cluster manager indicating that the NAS cluster manager is executing on the second storage appliance. The first task performed by the first code entity at the first integration point prior to upgrading the first storage appliance can further include subsequent to receiving the first response, the base system cluster manager sending a notification to the NAS cluster manager that the first storage appliance is about to be upgraded.

In at least one embodiment, processing can include associating a second code entity with a second of the plurality of integration points, wherein said second code entity performs storage appliance rollback processing. Processing can include: upgrading the first storage appliance resulting in an appliance upgrade failure within a first defined rollback window of the first storage appliance; responsive to the appliance upgrade failure of the first storage appliance, executing second code corresponding to second integration point to rollback the first component of the first software cluster installed on the first storage appliance from the first new version to the first current version and to rollback the second component of the second software cluster installed on the first storage appliance from the second new version to the second current version; and in response to executing the second code corresponding to the second integration point, invoking the second code entity associated with the second integration point, wherein said second code entity performs at least a second task in connection with the second cluster software due to the appliance upgrade failure of the first storage appliance. The second software cluster can include a second cluster manager executing on a second of the plurality of storage appliances, and the first software cluster can include a first cluster manager executing on a third of the plurality of storage appliances. The second task, that performed by the second code entity at the second integration point in response to the appliance upgrade failure of the first storage appliance within the first defined rollback window of the first storage appliance, can further include determining which of the plurality of storage appliances includes the second cluster manager executing thereon. Determining which of the plurality of storage appliances includes the second cluster manager executing thereon can include: the first cluster manager querying one or more of the plurality of storage appliances as to whether the second cluster manager is executing on the one or more storage appliances, wherein the one or more storage appliances queried includes the second storage appliance; and the second storage appliance sending a first response to the first cluster manager indicating that the second cluster manager is executing on the second storage appliance.

In at least one embodiment, the second task, that can be performed by the second code entity at the second integration point in response to the appliance upgrade failure of the first storage appliance within the first defined rollback window of the first storage appliance, can include the first cluster manager sending a notification to the second cluster manager regarding the appliance upgrade failure of the first storage appliance subsequent to receiving the first response.

In at least one embodiment, the second software cluster can be a NAS software cluster. The second cluster manager can be a NAS cluster manager. In response to the NAS cluster manager receiving the notification regarding the appliance upgrade failure of the first storage appliance, second processing can be performed. The second processing can include: the NAS cluster manager setting the NAS software cluster into a NAS cluster rollback mode; and restoring one or more file servers from a first processor node of the first storage appliance to a second processor node of the first storage appliance, wherein during said upgrading the first storage appliance, the one or more file servers were previously moved from the second processor node to the first processor node prior to upgrading the second processor node of the first storage appliance, and wherein said upgrading the first storage system failed prior to commencing upgrading of the first processor node. The second task performed by the second code entity at the second integration point in response to the appliance upgrade failure of the first storage appliance within the first defined rollback window of the first storage appliance can further include the first cluster manager sending a request to the second cluster manager to restart the one or more file servers on the second node of the first storage appliance in the second current version corresponding to a version of the NAS software cluster as prior to said upgrading the first storage appliance.

In at least one embodiment, associating the first code entity and first integration point can specify execution or runtime linkages between the first code entity and the first integration point. The first code entity can be a user-provided code entity. The first code entity, which can correspond to the first integration point, can be a callback routine or code module invoked in said first processing by the first executable code of an upgrade infrastructure in response to the first executable code of the upgrade infrastructure reaching said first integration point during the first processing.

In at least one embodiment, the plurality of storage appliances can include a primary appliance and two or more secondary appliances. The first storage appliance can be one of the two or more secondary appliances, and the first code corresponding to the first integration point can be invoked for each of the two or more secondary appliances prior to upgrading said each secondary appliance.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 4, 12 and 13 are flowcharts of processing steps that can be performed in an embodiment in accordance with the techniques of the present disclosure.

DETAILED DESCRIPTION OF EMBODIMENT(S)

Figure 1:
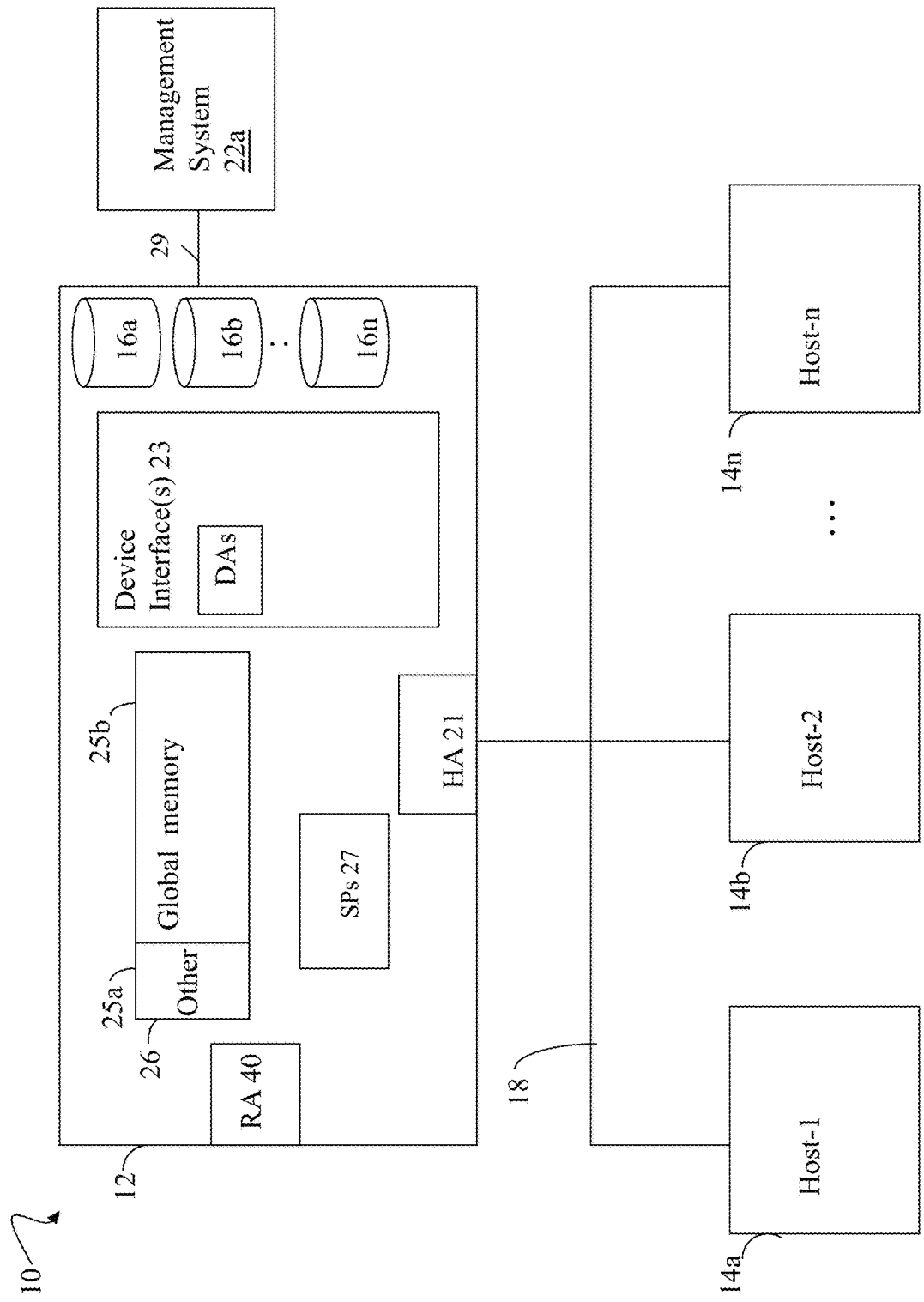
FIG. 1 is an example of components included in a system in accordance with the techniques of the present disclosure.

In at least one existing data storage system, a non-disruptive upgrade (NDU) can be performed where a data storage client, such as a host, is provided with continuous uninterrupted service and access to data stored on the data storage system. At least one such data storage system can include one or more dual node appliances providing high availability. If the system includes multiple dual node appliances, the multiple appliances can form a cluster or federation of the dual node appliances.

The NDU can be performed across the one or more appliances of the data storage system, for example, to upgrade existing software on all appliances of the system. One existing NDU technique can be characterized as a rolling upgrade because each appliance is upgraded and restarted, one after another, until all appliances in the systems have been upgraded. With the NDU, the data storage system can continue to provide uninterrupted service and access to the data while the software is being upgraded to the next version across all appliances of the system.

To provide uninterrupted service during the upgrade, complex coordination and orchestration of the upgrade processing is typically needed. For example, in at least one existing data storage system with a cluster of multiple dual node appliances, orchestration is needed to coordinate performing the upgrade across the multiple appliances. When upgrading each node of the appliance, the remaining peer node can handle the full workload (e.g., all I/Os, requests, and the like) of both nodes. Thus, different components are upgraded at different times throughout the complex upgrade procedure to ensure uninterrupted service providing data access and to maintain cluster high availability. However, providing the NDU also introduces complex dependencies between the different versions of software and data that can exist and run during the cluster upgrade. Upgrades can be complicated because, in addition to orchestrating the complex dependencies of a mixed version cluster, there can be many upgrade preconditions and postconditions to be satisfied in order to successfully complete the upgrade.

As a result, implementing an upgrade to a particular service, facility or feature, such as by a software developer, can be complex. The particular steps that a software developer needs to perform as well as when different types of upgrade work can be implemented during the upgrade workflow, process or cycle in a particular release often requires a deep understanding of the upgrade process, release content, and general system-wide architecture. Additionally, code performing an upgrade can also be required to be resilient, for example, to deal with failures, rollbacks, the ability to continue running in a failed or mixed version cluster upgrade, recovery and restarts of the upgrade. If upgrade work or processing is done incorrectly or misplaced in the upgrade workflow, the cluster upgrade can fail or become unstable which can cause downtime and data-loss. Such instability and data loss within a data storage system are generally undesirable and unacceptable due to the adverse impacts such as, for example, regarding a customer's ability to use the data storage system. Thus generally the amount of knowledge typically needed to properly implement a software upgrade can be beyond that of most developers. Additionally, the failure to properly perform upgrade processing work within the upgrade workflow can result in adverse, undesirable and unacceptable behavior.

Typically in existing systems, data storage system upgrades can be custom solutions designed to upgrade to a specific version of software. Feature upgrade work to a particular service or facility can be a best effort to add code for the upgrade without necessarily understanding the impact to other services or facilities, the overall upgrade process or to the system. Existing systems generally lack a specific infrastructure or framework for coordinating the different components of the system through the NDU process to prevent runtime errors, upgrade collisions among services and/or data, and coordination between dependencies. Existing upgrade procedures used by software development teams can rely on experience and working knowledge of the developers to implement an upgrade for a particular service or facility. Thus existing upgrade processes and procedures can be error prone and can result in leaving an existing system being upgraded in an undesirable and/or unpredictable state.

Accordingly, described in the following paragraphs are techniques which can be used to perform an upgrade or update in a system. The system can be a data storage system. In at least one embodiment, the data storage system can include one or more dual node appliances forming a cluster or federation. The upgrade or update can be a software upgrade or update and can be performed across the one or more appliances of the system. In at least one embodiment, the upgrade can be characterized as an NDU which is a rolling cluster upgrade where appliances of the system, and nodes of the appliances, can be upgraded in sequence. In at least one embodiment, the techniques of the present disclosure can use defined upgrade integration points which provide a defined structure to guide upgrades to data as well as upgrades to features, services or facilities through the complicated upgrade process.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14*a*-14*n* through the communication medium 18. In this embodiment of the SAN 10, the "n" hosts 14*a*-14*n* access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14*a*-14*n* access and communicate with the data storage system 12, and also communicate with other components included in the SAN 10.

Each of the host systems 14*a*-14*n* and the data storage system 12 included in the SAN 10 are connected to the communication medium 18 by any one of a variety of connections as provided and supported in accordance with the type of communication medium 18. The processors included in the host systems 14*a*-14*n* and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14*a*-14*n* and the data storage system 12 can all be located at the same physical site, or, alternatively, be located in different physical locations. The communication medium 18 used for communication between the host systems 14*a*-14*n* and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14*a*-14*n* and the data storage system 12 are connected to the communication medium 18 can pass through other communication devices, such as switching equipment, a phone line, a repeater, a multiplexer or even a satellite.

Each of the host systems 14*a*-14*n* can perform data operations. In the embodiment of the FIG. 1, any one of the host computers 14*a*-14*n* issues a data request to the data storage system 12 to perform a data operation. For example, an application executing on one of the host computers 14*a*-14*n* performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
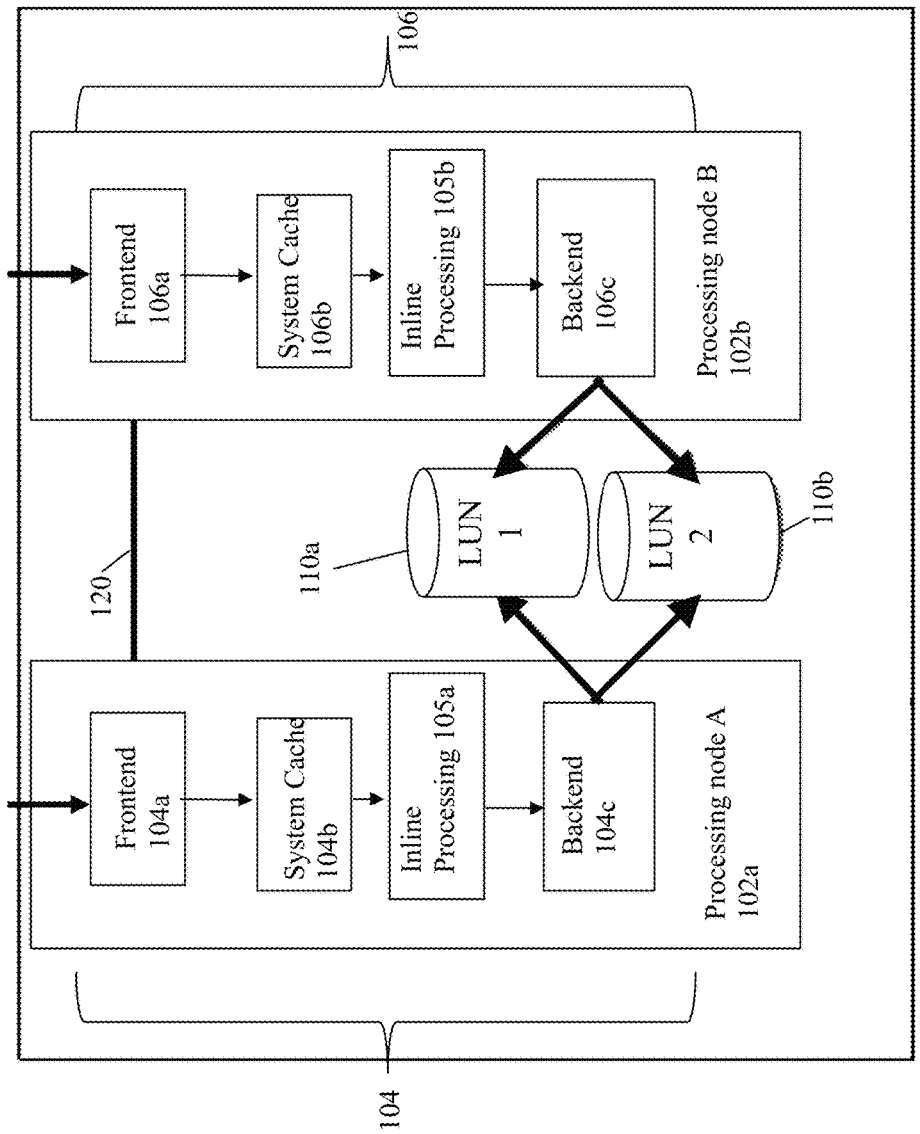
FIG. 2 is an example illustrating the I/O path or data path in connection with processing data in an embodiment in accordance with the techniques of the present disclosure.

With reference to the FIG. 2, shown is an example 100 illustrating components included in the data path in at least one existing data storage system in accordance with the techniques herein. The example 100 includes two processing nodes A 102a and B 102b and the associated software stacks 104, 106 of the data path, where I/O requests are received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing is performed by layer 105a. Such inline processing operations of 105a is optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing includes, for example, performing one or more data reduction operations such as data deduplication or data compression. The inline processing includes performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is directed to a location or logical address of a LUN and where data is read from, or written to, the logical address. The LUNs 110a, 110b are examples of storage objects representing logical storage entities included in an existing data storage system configuration. Since, in this example, writes, or more generally I/Os, directed to the LUNs 110a, 110b are received for processing by either of the nodes 102a and 102b, the example 100 illustrates what is also be referred to as an active-active configuration.

In connection with a write operation received from a host and processed by the processing node A 102a, the write data is written to the system cache 104b, marked as write pending (WP) denoting it needs to be written to the physical storage 110a, 110b and, at a later point in time, the write data is destaged or flushed from the system cache to the physical storage 110a, 110b by the BE component 104c. The write request is considered complete once the write data has been stored in the system cache whereby an acknowledgement regarding the completion is returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be optionally performed. For example, the inline processing can include performing data compression processing, data deduplication processing, and the like, that convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 is used for internode communication between the nodes 102a, 102b.

In connection with at least one embodiment in accordance with the techniques herein, each processor or CPU includes its own private dedicated CPU cache (also sometimes referred to as processor cache) that is not shared with other processors. In at least one embodiment, the CPU cache, as in general with cache memory, is a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache in at least one embodiment is substantially faster than the system RAM used as main memory, where the processor cache contains information that the processor will be immediately and repeatedly accessing. The faster memory of the CPU cache, for example, runs at a refresh rate that's closer to the CPU's clock speed, which minimizes wasted cycles. In at least one embodiment, there are two or more levels (e.g., L1, L2 and L3) of cache. The CPU or processor cache includes at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor is the closest of all cache levels (e.g., L1-L3) to the processor which stores copies of the data from frequently used main memory locations. Thus, the system cache as described herein includes the CPU cache (e.g., the L1 level cache or dedicated private CPU/processor cache) as well as other cache levels (e.g., the LLC) as described herein. Portions of the LLC are used, for example, to initially cache write data which is then flushed to the backend physical storage such as BE PDs providing non-volatile storage. For example, in at least one embodiment, a RAM based memory is one of the caching layers used as to cache the write data that is then flushed to the backend physical storage. When the processor performs processing, such as in connection with the inline processing 105*a*, 105*b* as noted above, data is loaded from the main memory and/or other lower cache levels into its CPU cache.

In at least one embodiment, the data storage system is configured to include one or more pairs of nodes, where each pair of nodes is generally as described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure includes the minimum single pair of nodes and up to a specified maximum number of PDs. In some embodiments, a single base enclosure can be scaled up to have additional BE non-volatile storage using one or more expansion enclosures, where each expansion enclosure includes a number of additional PDs. Further, in some embodiments, multiple base enclosures are grouped together in a load-balancing cluster to provide up to the maximum number of node pairs. Consistent with other discussion herein, each node includes one or more processors and memory. In at least one embodiment, each node includes two multi-core processors with each processor of the node having a core count of between 8 and 28 cores. In at least one embodiment, the PDs are all non-volatile SSDs, such as flash-based storage devices and storage class memory (SCM) devices. It should be noted that the two nodes configured as a pair are also sometimes be referred to as peer nodes. For example, the node A 102*a* is the peer node of the node B 102*b*, and the node B 102*b* is the peer node of the node A 102*a*.

In at least one embodiment, the data storage system is configured to provide both block and file storage services with a system software stack that includes an operating system running directly on the processors of the nodes of the system.

In at least one embodiment, the data storage system is configured to provide block-only storage services (e.g., no file storage services). A hypervisor can be installed on each of the nodes to provide a virtualized environment of virtual machines (VMs). In at least one embodiment, the system software stack executes in the virtualized environment deployed on the hypervisor. In at least one embodiment, the system software stack (sometimes referred to as the software stack or stack) includes an operating system running in the context of a VM of the virtualized environment. Additional software components can be included in the system software stack and can also execute in the context of a VM of the virtualized environment.

In at least one embodiment, each pair of nodes is configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not be shared with other pairs of nodes. A host can access data stored on a BE PD through the node pair associated with, or attached to, the PD.

In at least one embodiment, each pair of nodes provides a dual node architecture where both nodes of the pair are generally identical in terms of hardware and software for redundancy and high availability. Consistent with other discussion herein, each node of a pair performs processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair includes its own resources such as its own local (i.e., used only by the node) resources such as local processor(s), local memory, and the like.

In at least one embodiment, a data storage system can include one or more storage appliances where each such appliance is a dual node appliance such as described in connection with FIG. 2. In such an embodiment, each appliance can be a dual node appliance including two processing nodes 102*a-b* which communicate with each other over an internal network connection or interconnect 120 between the nodes 102*a*, 102*b*.

In at least one embodiment, each of the nodes 102*a-b* can be configured with one or more internal disk drives used only by that particular node. The internal disk drives of the nodes can be, for example, non-volatile solid state drives. For example, the node 102*a* can be configured with one or more internal disk drives used only by the node 102*a*. An internal disk drive of each of the nodes 102*a-b* can be used as the main boot device for the node. For example, a first internal disk drive of the node 102*a* can be used as the main boot device of the node 102*a*, and a second internal disk drive of the node 102*b* can be used as the main boot device of the node 102*b*. Each of the two nodes 102*a-b* can boot up and operate independently of the other node. In this case, the dual node architecture provides high availability for the single appliance including the nodes 102*a-b* in that, for example, if one of the nodes 102*a-b* is offline, down or generally unable to service requests, such as I/O operations, the other one of the nodes 102*a-b* which remains healthy and operable can still service and handle requests, such as I/O requests for LUNs having storage configured on BE PDs accessible only to the single appliance. Thus, with a dual node appliance, the appliance provides high availability in that the appliance can continue to service requests and provide access to data stored on its BE PDs in the event of a single node failure.

As noted above, implementing an upgrade to a particular service, facility or feature of the data storage system, such as by a software developer, can be complex. The upgrade can also include adding a new feature, service or facility as well as upgrading an existing feature, service or facility. The particular steps that a software developer needs to perform as well as when such particular upgrade work can be implemented during the upgrade process or cycle in a particular release often require a deep understanding of upgrade process, release content, and general system-wide architecture. Thus generally the amount of knowledge typically needed to properly implement a software upgrade can be beyond that of most developers.

Accordingly, described in the following paragraphs are techniques which can be used to perform an upgrade or update in a system. The system can be a data storage system. In at least one embodiment, the data storage system can include one or more dual node appliances forming a cluster or federation. The upgrade or update can be a software upgrade or update and can be performed across the one or more appliances of the system. In at least one embodiment, the upgrade can be characterized as an NDU which is a rolling cluster upgrade where the appliances, and nodes of the appliances, can be upgraded sequentially. In at least one embodiment, the techniques of the present disclosure use defined upgrade integration points which provide a defined structure to guide feature, service, facility and/or data upgrades through the complicated upgrade process.

In at least one embodiment of the techniques of the present disclosure, an upgrade infrastructure with defined integration points can be utilized. The upgrade infrastructure or framework (sometimes simply referred to as infrastructure or framework) guides components of the system through the complicated upgrade process to reduce NDU runtime failures and errors associated with data and feature or service dependencies. The integration points provide organization and structure to the upgrade process. The integration points correspond to defined points in the upgrade process where specific types of work or upgrade processing can be performed during the upgrade workflow process.

In at least one embodiment, main areas of concern during upgrade can relate to data and also the components in the system. One main area of concern can be how one or more data source or containers used by the system and its components are upgraded. Such data sources or containers can include, for example, the data storage system configuration information regarding physical and/or logical entities in a current configuration of the data storage system. A second main area of concern can relate to how a particular component, such as a feature, facility or service, or a node or an appliance of the cluster, behaves while the cluster is being upgraded. For example, in at least one embodiment during the upgrade process as described in the following paragraphs, mixed versions of software can exist across appliances of the cluster. The techniques of the present disclosure can be used to coordinate and orchestrate transitioning appliances of the cluster from running a prior version of software of a particular feature, service or facility to an upgraded version of the software for the particular feature, service or facility.

In at least one embodiment, the integration points can each support either a data upgrade or a software (e.g., executable code) upgrade since these different types of upgrade operations are orchestrated at different phases in the upgrade to manage the complex dependencies between different versions of data and software. In at least one embodiment, a software upgrade can also include installing a new feature, service or facility (e.g., performing an initial installation of the new feature since this is an initial version of the new feature). In at least one embodiment, a data schema upgrade, cluster compatibility, feature enablement and pre-upgrade health checks are examples of directed upgrade work which can be supported through used of the defined integration points.

In at least one embodiment, each integration point defined in connection with an upgrade process or workflow can support a particular type of upgrade work. Such defined integration points makes it clear to a developer implementing an upgrade to a particular service or facility what options are available at a particular phase in the upgrade workflow, and where in the upgrade workflow a particular type of upgrade processing work is supported. In at least one embodiment, the integration points identify where particular types of upgrade work or processing are performed in the upgrade workflow to avoid, for example, runtime failures and to promote, for example, successful integration among multiple services and facilities as well as any upgrade dependencies.

To further illustrate in at least one embodiment, updates to the cluster wide management database can be supported at one or more integration points such as, for example, integration points 3B, 5B and 6 discussed below. However, in at least one embodiment, upgrading a local database that is locally used only by one appliance can only be done in connection with integration point 3A discussed below.

As another example in at least one embodiment, modifying or upgrading the schema or structure of the cluster wide management database can be performed, for example, in connection with integration points 3B and 5B. Data transformation or migration of existing content of the cluster wide management database can be performed, for example, in connection with the integration point 6, which can occur after the schema upgrade of the management database in connection with integration points 3B and 5B. The foregoing can be done to ensure, for example, that any data migration or transformation of the management database associated with integration point 6 takes place after the database schema upgrade to the management database has been completed in prior integration points 3B and 5B, and to ensure that data transformation at integration point 6 is complete before any new or upgraded feature behavior is enabled at a following subsequent integration point such as, for example, integration point 9 discussed below.

In at least one embodiment using the defined integration points of the cluster upgrade workflow, customized upgrade work or processing can be integrated into the workflow in a consistent manner across multiple different features, services or facilities in a single upgrade, and also across multiple different upgrades. In at least one embodiment, the upgrade work or processing can include upgrading an existing feature, facility or service where a developer or user can provide additional code that performs the customized upgrade work at one or more corresponding integration points. In at least one embodiment, the upgrade work or processing can include adding a new feature, facility or service which does not exist in a current version of software running on the one or more appliances of the data storage system.

In at least one embodiment, the upgrade infrastructure code coordinates processing performed for an upgrade workflow. The upgrade infrastructure code can exist independently of other code of features, facilities or services which are upgraded and also independently of other code that performs customized processing to upgrade a feature, facility or service. The upgrade infrastructure code can define particular integration points identifying where other developer-provided code (e.g., also sometimes referred to as user code, user-specified code or user-provided code where the feature or facility developer can be the "user") can be invoked or triggered to perform any needed upgrade work or processing to upgrade a particular feature, facility or service. In this manner, the upgrade infrastructure code can be tested and maintained separately from other user-provided code which is invoked at a particular integration point, where the user-provided code performs customized upgrade work to implement an upgrade to a particular feature, service or facility. Thus, code which performs customized processing to upgrade a particular feature, service or facility can be written by the developer of such a feature or service. The developer, as a user of the upgrade infrastructure, does not need complete or intricate knowledge regarding the upgrade infrastructure code. Rather, the developer can have a more limited working knowledge regarding the particular defined integration points of the infrastructure. The developer of a particular feature, service or facility, as a user of the upgrade infrastructure, can specify what code routines or modules are invoked at the defined integration points, where the code routines or modules perform customized upgrade work or processing to upgrade the particular features, service or facility without modifying the code of the upgrade infrastructure. In at least one embodiment, the upgrade infrastructure code can perform some required general processing to upgrade a feature, service or facility such as, for example, install an updated software version of the feature, service or facility on all the nodes of the appliances and coordinate such installation across the nodes and appliances of the system. The integration points can be characterized as hooks or points which identify upgrade workflow processing points at which a user or developer can perform additional customized upgrade processing work for the particular feature, service or facility being upgraded. Thus in at least one embodiment, the work or processing needed to upgrade a service, facility or feature can be partitioned between the upgrade infrastructure code and other user or developer provided code invoked at the different integration points.

In at least one embodiment, the techniques of the present disclosure can be used to provide an NDU that is a rolling upgrade providing support for: appliance high availability where one node of an appliance can be upgraded at a time; cluster high availability as each appliance is upgraded one appliance at a time; cluster database upgrades (e.g., upgrades to the management database) and local appliance database upgrades; upgrading a client code module within the cluster where the client code module invokes or uses an upgraded version of a feature, facility or service being upgraded (e.g., where a first appliance or first node can include the client code module which performs a call or request to a second appliance or second node including the feature, facility or service being upgraded); an upgrade that can include installing a new feature, service or facility; data upgrades; container or VM placement whereby services can be moved between nodes; and cluster heath checks.

In at least one embodiment providing cluster high availability, all appliances in the system can execute with runtime behavior of the same version of software at any point in time with one or more appliances sometimes operating in a runtime compatibility mode discussed in more detail below. The foregoing can provide for high availability within the cluster so that appliances can communicate with one another whereby one appliance can perform processing, as may be needed, on behalf of another degraded or unavailable appliance. In at least one embodiment, an upgraded feature may not be enabled on any appliance until integration point 9, as discussed below, where processing can be performed to enable the upgraded features across all appliances so that all appliances are enabled atomically. The foregoing provides for consistent inter-appliance communication as well as consistent communication with external data storage system clients, such as a host, in that any internal or external client of the data storage system can communicate with any node or any appliance of the system using the same software version. Thus, in at least one embodiment although an upgraded version of a feature, service or facility can be installed on less than all nodes or less than all appliances of the system, the upgraded version is not yet enabled for use on such nodes or appliances. Rather, in at least one embodiment of the techniques of the present disclosure, the upgraded version can be enabled for use once the upgraded version (e.g., upgraded software or code, as well as upgraded database schema and database content upgrades) has been committed and is successfully installed and ready for use on all nodes and all appliances of the system.

In at least one embodiment, the integration points of the upgrade infrastructure or framework can be characterized as specifying rules of an upgrade policy. The integration points can, for example, embody the policy rules and the scope and types of work or processing that can be performed at different upgrade workflow points associated with the integration points. Put another way, the integration points correspond to upgrade workflow processing points which are supported by the upgrade infrastructure for performing different types of allowable processing or work when implementing an upgrade for a feature, service or facility. For example as discussed below, data transformation or migration can be performed at integration point 6 after all appliances have been upgraded. However, the infrastructure does not support performing data transformation or migration, for example, at prior integration point 4A or 4B, since all appliances have not been upgraded at such prior integration points 4A and 4B.

In at least one embodiment, defined integration points can be used to specify and identify upgrade options and particular types of processing or upgrade work supported at different points in time in the upgrade workflow. The upgrade infrastructure can include code that drives and controls the upgrade workflow process and additionally performs calls to user or developer provided code associated with the different integration points at corresponding points in the upgrade workflow. The integration points can guide feature owners through the upgrade workflow by clearly identifying upgrade options that are supported at different corresponding upgrade workflow processing points. Thus the integration points provide structure for a user or feature developer that uses the upgrade infrastructure. For example, the integration points make it easy for the user or developer to understand what options are available for the types of upgrade work to be performed at different points in the upgrade workflow. A user or feature developer can, for example, provide user-specified code modules or routines that perform customized upgrade tasks. Each user-specified code module or routine can be associated with an integration point, where the integration point is further associated with a corresponding upgrade workflow processing point. The user specified code module which is associated with an integration point can be invoked by code of the upgrade infrastructure at an appropriate workflow processing point in the upgrade, where the workflow processing point is associated with the integration point. In at least one embodiment, the integration points can be further characterized as integration hooks for upgrading data and managing feature behavior during the upgrade. In at least one embodiment, the integration hooks represented by the integration points can denote specific points in the upgrade workflow where customized upgrade work or processing can be performed to implement an upgrade for a particular feature, service or facility. In at least one embodiment, the customized upgrade work or processing can be embodied in a user-provided or a developer-provided code module or routine which is invoked, by the infrastructure code, at an associated workflow processing point during the upgrade workflow process.

The runtime linkage between the user or developer provided code modules or routines and the infrastructure code can be defined and established using any suitable technique such that the user provided code modules or routines are invoked at different workflow processing points which are associated with different integration points. In at least one embodiment, the user or developer provided code module can be invoked at a corresponding upgrade workflow processing point using a callback mechanism which generally associates or links the user specified routine or code module with the corresponding integration point, where the integration point is further associated with a particular upgrade workflow processing point. For example, in at least one embodiment, a defined interface or API (application programming interface) of the infrastructure code can be used to specify the associated linkages between the integration points and corresponding user provided or developer provided code modules, routines or bodies of code which are invoked at particular workflow processing points corresponding to the associated integration points. For example in at least one embodiment, an API can be used to make a call into the infrastructure code where parameters of the API identify the association or runtime linkage between a particular user provided code module or routine and a corresponding integration point. The API call can be made from user or developer code to define and establish the necessary runtime linkages between the upgrade infrastructure code's integration points and other user provided code modules or routines associated with corresponding integration points. The particular syntax and semantics of the API can vary with implementation such as, for example, can vary with the particular coding or programming language used. For example, the API can specify to invoke a user provided code module or routine, "routine1", at integration point 1, where integration point 1 is further associated with workflow processing point 1 in the upgrade workflow controlled by the upgrade infrastructure. In this manner in at least one embodiment, the user provided code, "routine1", can be a callback routine or function where the name, a reference or a pointer to the user provided code, "routine1", can be passed as an argument in the defined API of the upgrade infrastructure, and where the callback routine or function "routine1" is subsequently invoked or called by the upgrade infrastructure code at an appropriate workflow point which is associated with integration point 1 in the upgrade workflow processing. In one embodiment in accordance with the techniques of the present disclosure, the foregoing API can be used to generally register the callback routine or function with a particular integration point of the upgrade infrastructure. More specifically, the foregoing API can be used to register, with the upgrade infrastructure, the association between the callback routine or function and a corresponding integration point at which the callback routine or function is later invoked by the upgrade infrastructure.

In at least one embodiment, each integration point can be associated with one or more callbacks or code entry points to the different user or developer provided code modules, routines or bodies of code. An integration point can be further associated with a corresponding upgrade workflow processing point. At runtime, the upgrade infrastructure code executes and can control or drive the upgrade workflow processing and can also invoke the user or developer provided code modules, routines or bodies of code at different upgrade workflow processing points. For example, a first user provided routine can be associated with a first integration point which is further associated with a first upgrade workflow processing point. The upgrade infrastructure code executes and, at the first upgrade workflow processing point, transfers control to the first user provided routine to execute code of the first user provided routine. Once the first user provided routine has completed execution, runtime control can transfer back to the upgrade infrastructure code to continue with the upgrade workflow processing and additionally invoke any user provided code modules or routines which are associated with corresponding subsequent upgrade workflow processing points.

The foregoing and other aspects of the techniques of the present disclosure are described in more detail in the following paragraphs.

Figure 3:
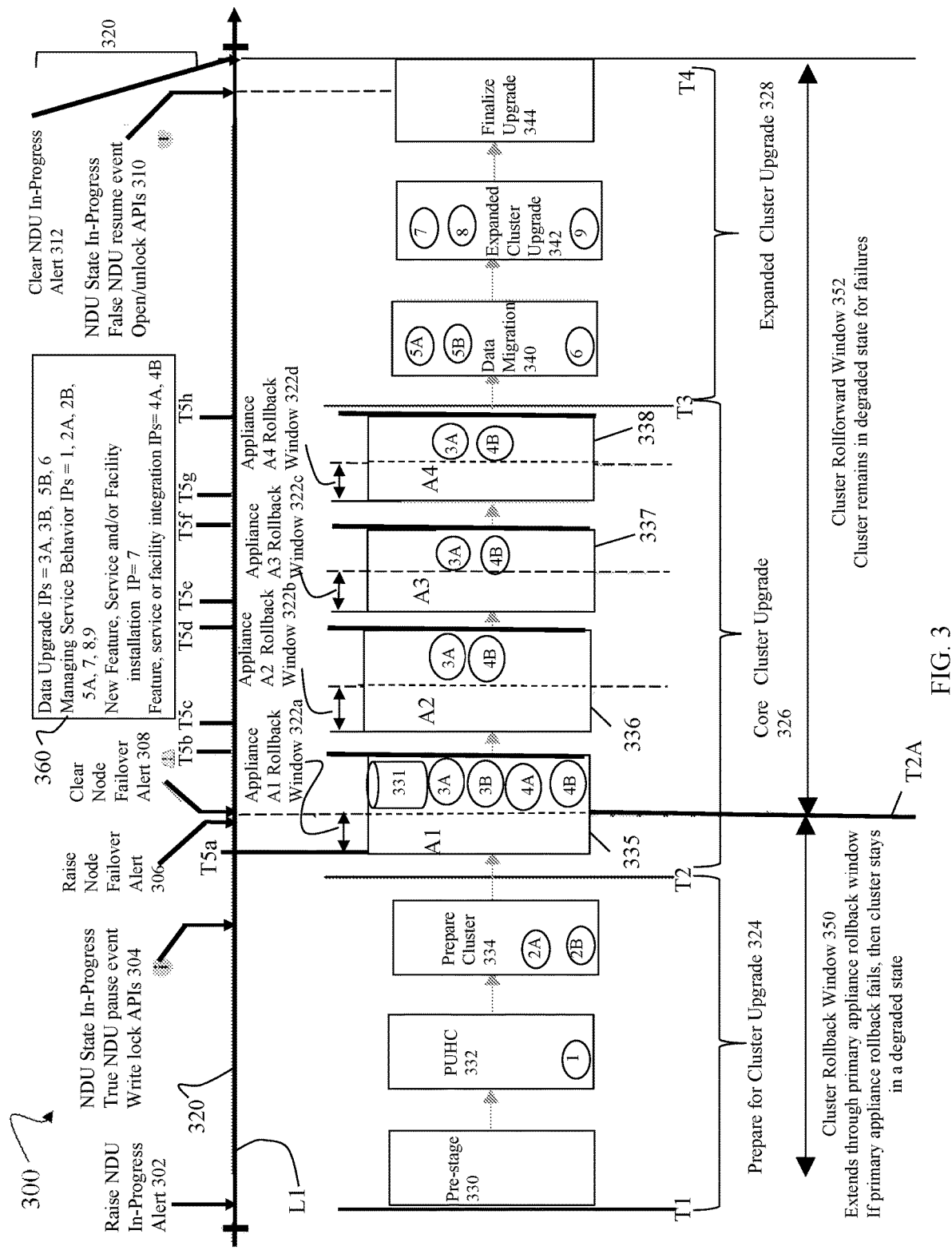
FIGS. 3 and 6 are examples illustrating components of a cluster, an upgrade workflow and integration points in at least one embodiment in accordance with the techniques of the present disclosure.

Referring to FIG. 3, shown is an example 300 illustrating components and integration points in at least one embodiment in accordance with the techniques of the present disclosure.

In the example 300, there are 4 dual node appliances A1 335, A2, 336, A3 337 and A4 338 in the data storage system cluster or federation of appliances for illustrative purposes. More generally, the data storage system can include one or more appliances. In at least one embodiment illustrated in the example 300, integration points can be specified, where the integration points discussed below can include the following: 1, 2A, 2B, 3A, 3B, 4A, 4B, 5A, 5B, 6, 7, 8 and 9. Each of the foregoing integration points are denoted in the FIG. 3 illustrating where processing associated with such integration points can be performed in the upgrade processing workflow. In particular, the upgrade infrastructure or framework can include code which performs the illustrated upgrade processing workflow and additionally includes hooks or support at the different defined integration points where other developer or user provided code can be invoked to perform customized upgrade work or processing to implement an upgrade of a particular feature, service or facility.

In at least one embodiment, the upgrade infrastructure can include code that prepares for the cluster upgrade phase 324, performs processing for the core cluster upgrade phase 326, and performs processing of the expanded cluster upgrade phase 328. Code of the upgrade infrastructure can drive or control the upgrade workflow phases 324, 326 and 328 and additionally perform calls to user provided code at the various integration points to perform customized upgrade work or processing in connection with upgrading different features, facilities or services. As illustrated in FIG. 3 in at least one embodiment, the phases 324, 326 and 328 can be performed sequentially in order. In at least one embodiment, the phase 324 can include performing processing denoted by the elements 330, 332 and 334 sequentially. In the phase 324 in at least one embodiment, the processing associated with integration points 1, 2A and 2B can be performed in sequential order. In the phase 326 in at least one embodiment, each of the appliances 335-338 can be upgraded sequentially characterizing a rolling upgrade of the appliances 335-338. When the primary or first appliance 335 is upgraded, the processing associated with the integration points 3A, 3B 4A and 4B can be performed in sequential order. When each of the secondary appliances 336-338 is upgraded, the processing associated with the integration points 3A and 4B can be performed in sequential order. As illustrated in FIG. 3 in at least one embodiment, the phase 328 can include performing processing denoted by the elements 340, 342 and 344 sequentially in order. In the phase 328 in at least one embodiment, the processing associated with integration points 5A, 5B, 6, 7, 8 and 9 can be performed in sequential order.

In at least one embodiment as denoted by the element 360, the integration points 3A, 3B, 5B and 6 can be characterized as generally related to processing performed in connection with the management of data or upgrading the data in the system such as, for example, the cluster-wide management database and its contents, and the appliance-local databases and their contents.

In at least one embodiment as denoted by the element 360, the integration points 1, 2A, 2B, 7, 8 and 9 can be characterized as generally related to processing performed in connection with managing the behavior of features, services and/or facilities on the system.

In at least one embodiment as denoted by the element 360, the integration point 7 can be characterized as generally related to processing performed in connection with installing a new feature, service of facility on the system, where the system does not currently have any version of the new feature, service or facility prior to the installation at the integration point 7.

In at least one embodiment as denoted by the element 360, the integration points 4A and 4B can be characterized as generally related to processing performed in connection with integration of the upgraded features, services and/or facilities with other components.

The foregoing regarding the various integration points, phases and processing performed in connection with the upgrade workflow illustrated in FIG. 3 is described in more detail in the following paragraphs.

The upgrade processing workflow of FIG. 3, and thus code of the upgrade infrastructure, can be invoked in response to a trigger event such as, for example, a user requesting that an upgrade of one or more features, facilities or services be performed. The user, for example, can make the request using a GUI of a data storage management application. For example, the user can make a selection of a user interface element, such as a menu selection, selection of a button, and the like, from the GUI of the management application. In response to the selection, the upgrade processing workflow of FIG. 3 can commence. Thus in at least one embodiment in response to the user selection, the code of the upgrade infrastructure in accordance with the techniques of the present disclosure can be launched and executed to perform processing of the upgrade processing workflow of FIG. 3 which is described in more detail in the following paragraphs.

The element 320 illustrates different alerts and feedback that can be provided to a user in connection with current progress of the upgrade over time. The line L1 denotes the time progression of the upgrade process where the line L1 is annotated with different information or feedback as may be provided at different points in time on a display of a GUI to a user or customer, such as a data storage administrator, of the data storage system.

The time T1 or 302 can denote the point in time when upgrade processing starts and results in display of the alert 302 indicating that the NDU is now in-progress. The point in time denoted by the element 304 indicates the point in time when the NDU is in-progress and the upgrade infrastructure performs processing to write lock, pause, temporarily block or disable use of particular APIs or commands such as those which can be invoked by an external client (e.g., external to the data storage system) using control path or management path requests. For example, a data storage system management application or script executing on a host or other external system can be external to the data storage system and can issue management commands or requests using one or more APIs, such as REST (representational state transfer) APIs, which can modify the data storage system configuration information. The externally issued REST API call can be, for example, a request to provision or configure a new LUN, where servicing or implementing the API requires modifying the existing data storage system configuration information as may be stored in a cluster data base on the data storage system. In this case, the upgrade infrastructure can perform processing which temporarily blocks or disables any externally issued control path REST API, such as from an external client, which writes, updates or performs modifications to a cluster database, such as the management database which includes the data storage system configuration information, which can be affected by the upgrade (e.g., where the data can be modified by the upgrade processing, and/or where the schema or structure of the data can be modified by the upgrade processing). In at least one embodiment, although the write lock is placed on the externally issued APIs at the time 304 where such externally issued APIs can modify data affected by the upgrade, all APIs which only get or read such data can still be allowed and serviced. For example, an externally issued REST API (e.g., from a script or a data storage management application) which reads data storage system configuration information from the management database, such as regarding the currently provisioned LUNs in the system, can still be serviced while other externally issued REST APIs which can write or modify the current data storage system configuration information of the management database are disabled or paused at the time 304.

Additionally in at least one embodiment, the write lock, pause or disabling of particular APIs in the step 304 can also affect what processing can be performed by code which upgrades a particular feature, service or facility. For example, user or developer code which performs processing to upgrade a particular service can be restricted as to when a particular REST API can be invoked, where the particular REST API modifies data storage system configuration information. For example, a first REST API which modifies the data storage system configuration information can be disabled at the point in time 304 and then re-enabled at the point in time 310. In this case, the user or developer code using the first REST API can only execute calls to the first REST API either prior to the time 304, or after the point in time 310.

At the point in time 306, an alert can be raised indicating that a node failover occurred within the appliance A1 335. At the point in time 308, an alert can be raised indicating that the alert for the appliance A1 335 regarding the node failover is cleared. More generally, in each dual node appliance, similar alerts for 306 and 308 can be raised as each node of the appliance is upgraded, fails over to its peer, and then reverts back online whereby the alert for the node is cleared 308.

At the point in time 310, an alert can be raised indicating that the NDU has completed and that the APIs previously paused, disabled, blocked or write locked in the step 304 are now re-enabled.

At the point in time 312, the NDU in-progress alert, which was previously raised at the point 302, can be cleared.

The prepare for cluster upgrade phase 324 can include pre-stage processing 330, PUHC (pre upgrade health check) processing 332 and prepare cluster processing 334. Generally, the phase 324 can include performing processing needed to prepare the cluster for the upgrade for one or more features, services or facilities and ensure that the cluster is in a healthy state in order to successfully perform the cluster upgrade. The pre-stage processing 330 can include, for example, copying the upgrade image or package to the data storage system such as, for example, to a staging area on each of the appliances 335-338. Subsequently, the upgrade image or package can be unbundled or unpackaged and stored in specified locations in the file system on each node. In at least one embodiment, the upgrade image or package can have a predefined format including code and/or data as well as other items, such as one or more scripts, that can be used during the upgrade process. Thus, the element 330 can include, for example, unpacking the multiple pieces of the upgrade image or package and then storing the different unpacked pieces of code, data and other items in particular locations on each node. For example, the particular locations can include particular directories, particular files having particular filenames in specified directories, and the like.

The PUHC processing 332 can be executed before every upgrade to ensure the cluster is sufficiently healthy to support performing an upgrade. In at least one embodiment, integration point 1 can be referred to as the "PUHC integration point" included in the workflow of the PUHC processing 332. The PUHC processing 332 for health or status checks can be run against the current version V1 of different features, services or facilities running in the appliances and also generally with respect to the current state or conditions of the appliances. In at least one embodiment, the PUHC processing 332 can be performed with respect to each of the appliances 335-228 of the system. A user of the infrastructure can specify a user provided code module or routine associated the PUHC integration point 1, for example, to check for a specific condition that must be satisfied before upgrading of a particular feature, facility or service can be performed. In at least one embodiment, the user provided code module or routine associated with integration point 1 can be invoked and executed on each of the appliances. For example with reference to FIG. 3, the user provided code module or routine associated with integration point 1 can be invoked and executed on each of the 4 appliances 335-338. As a variation, the user provided code module or routine associated with integration point 1 can execute on one of the appliances which can communicate with the other appliances to perform the necessary checks and other processing pertaining to each of the appliances 335-338.

In at least one embodiment, the specific condition checked for by the user provided code module or routine associated with integration point 1 can include, for example, checking that each appliance has at least a minimum amount of disk space (e.g., such as on an internal disk of the appliance, and/or on BE PDs used by the appliance) needed to perform the upgrade of the particular feature, facility or service. The specific condition checked for by the user provided code module or routine associated with integration point 1 can include, for example, checking that each appliance has running thereon a second feature, service or facility which can be, for example, used during the upgrade process and/or used by the particular feature, facility or service being upgraded. The specific condition checked for by the user provided code module or routine associated with integration point 1 can include, for example, checking that each appliance has running thereon a particular version of a second different feature, service or facility which can be, for example, used during the upgrade process and/or used by the particular feature, facility or service being upgraded. The specific condition checked for by the user provided code module or routine associated with integration point 1 can include, for example, checking that each appliance has currently running thereon a particular version of the feature, service or facility being upgraded. The specific condition checked for by the user provided code module or routine associated with integration point 1 can include, for example, checking that each appliance has running thereon one or more particular versions of a second feature, service or facility which are compatible for use with the upgraded version V2 of the particular feature, service or facility being upgraded from a current existing version V1.

Generally in at least one embodiment, the user provided code module or routine, which is associated with integration point 1 for a particular feature, service or facility to be upgraded, can perform processing to check for any desired preconditions or dependencies which need to be met in order to proceed with upgrading the particular feature, service or facility. In at least one embodiment, the upgrade processing can fail if any single check of the PUHC fails on any single appliance. More generally in at least one embodiment, processing performed by any user provided code module or routine for any integration point can determine an appropriate execution status based on the particular results and the processing performed by the user provided code module or routine. For example, depending on the particular health check condition checked for in integration point 1, the user provided code module invoked at integration point 1 can determine whether meeting the particular condition should result in an error, a warning, or another execution status. In at least one embodiment, a status of error can result in termination of the upgrade processing whereby the upgrade processing does not proceed until the associated condition no longer results in the error status. As a variation, a status of warning can denote a less severe condition than an error status whereby upgrade processing can be allowed to proceed if a warning status results from execution of the user provided code module or routine.

The prepare cluster processing 334 can include performing any necessary preparatory processing prior to proceeding with an upgrade of a particular feature, service or facility in the system. In at least one embodiment, the integration point 2A can be associated with a workflow processing point of the upgrade workflow in prepare cluster processing 334. The integration point 2A can also be referred to as the "prepare cluster for upgrade" integration point which is associated with an upgrade workflow processing point at which upgrade tasks can be performed to prepare a component, such as a node or appliance, before the core cluster upgrade phase 326 begins. The integration point 2A executes in the context of the current running version of software and/or data on the appliances (e.g., such as V1) prior to performing an upgrade to version (e.g., V2) of software and/or data for one or more features, services or facilities. In at least one embodiment, the user provided code module or routine associated with integration point 2A can be invoked by the infrastructure code and executed with respect to each of the appliances. For example with reference to FIG. 3, the user provided code module or routine associated with integration point 2A can be invoked by the infrastructure code and executed on each of the 4 appliances 335-338, or alternatively execute on one of the appliances which then communicates with the remaining appliances to implement the desired processing, In at least one embodiment, services, features or facilities currently running on the appliance in the phase 324 can optionally continue to run during the upgrade, or alternatively can be paused, disabled or otherwise not run during the upgrade. In at least one embodiment, non-critical features, service or facilities can be paused, disabled or stopped during the upgrade at integration point 2A whereby only those particular features, services or facilities deemed critical continue to run during the upgrade. In at least one embodiment, it can be generally recommended that a feature, facility or service does not run during the upgrade processing in phase 326 unless required or necessary since the upgrade process can be significantly simpler for features, services or facilities that are not running during the subsequent upgrade phase, such as 326. For example, if a service which is upgraded is not running in the phase 326, the service does not have to support complex mixed version dependencies and does not have to support running in a compatibility mode on an appliance as discussed elsewhere herein (e.g., when executing in compatibility mode such as in the core cluster upgrade phase 326, the service may have been upgraded on an appliance from V1 to V2 but continues to run in accordance with the V1 runtime behavior in the phase 326).

The integration point 2A noted above can be used to prepare a feature, service or facility to run during the upgrade, or to alternatively disable, pause or not run/stop the feature, service or facility during the upgrade, such as during the phase 326. Generally, any feature, service or facility that is stopped, disabled or paused at the integration point 2A can be subsequently resumed, restarted, or re-enabled at the integration point 9 (e.g., the Expanded Cluster Upgrade Resume Services integration point) of the phase 328 described below. For example, integration point 2A can be used to manage placement of a particular service on a particular node of an appliance and/or to pause a particular service or facility such as, for example, a particular data protection service or facility running on the appliances 335-338. Thus, a user provided code module or routine can be associated with the integration point 2A for a particular feature, service or facility being upgraded, where the code module or routine can pause, disable or not run the particular feature, service or facility during the upgrade in the phase 326. More generally, the user provided code module or routine associated with the integration point 2A can pause, disable, stop or not run any desired feature, service or facility during the upgrade in the phase 326. Subsequently the feature, service or facility paused or stopped at the integration point 2A can be later restarted or resumed, for example, at the integration point 9 of the phase 328 or at the integration point 4A as discussed below.

The elements 322*a-d* denote appliance rollback windows, respectively, for the appliances A1-A4 335-338 where the particular appliances can rollback to a current version V1, for example, if a failure or error occurs when upgrading from the current version V1 to the version V2 of a feature, facility or service. In at least one embodiment with dual node appliances 335-338, an upgrade of a feature from V1 to V2 on an appliance such as 335 can be rolled back to V1 if there is an error or other event in the rollback window 332*a* causing the upgrade on the appliance 335 to fail. In at least one embodiment as discussed above with a dual node appliance, a first node of the appliance can be upgraded and then the second node of the appliance can be upgraded in sequence. In such an embodiment, the appliance can rollback to the prior version V1 of the feature if the upgrade of the second node to V2 has not yet commenced. In such an embodiment, the appliance level rollback processing can include using content of the second node still running V1 to rollback the first node's V2 upgrade to V1 by restoring the first node to its V1 or pre-upgrade state. For example, the content of the internal disk of the second node can be used to restore content of the internal disk of the first node, as may be needed, from V2 to V1, where such internal disks of the nodes can include code and/or data of the feature whose upgrade failed.

Thus generally the rollback windows 332*a-d* denote a window of time during which processing is performed to upgrade, respectively, the appliances 335-338 such that if a failure occurs during a particular appliance's rollback window, the particular appliance's upgrade can be rolled back or restored to a pre-upgrade state.

The integration point 2B can also be referred to as "the prepare cluster rollback integration point" which is associated with an upgrade workflow processing point at which upgrade rollback tasks can be performed when the cluster upgrade is rolled back such as, for example, due to an upgrade failure during cluster rollback window 350. The integration point 2B is associated with an upgrade workflow processing point where any needed rollback work can be performed in the event the cluster upgrade is rolled back such as due to an upgrade error or failure within the initial or primary appliance rollback window 322*a*. For example, in at least one embodiment, a user provided code module can perform rollback work at the integration point 2B, where the user provided code module can be invoked by the infrastructure code in response to rolling back the cluster upgrade such as due to an error or upgrade failure occurring during the rollback window 322*a* of the appliance 335. The user provided code module associated with integration point 2B can, for example, undo any processing performed previously in connection with another user provided code module associated with integration point 2A. For example, the user provided code module associated with integration point 2B can, for example, restart or resume any feature, service or facility which was disabled, paused or stopped previously on the appliances 335-338 by the other user provided code module associated with integration point 2A. A first routine can be associated with a first service being upgraded where the first routine performs preparatory work for upgrading the first service and wherein the first routine is invoked at integration point 2A. A second routine can be associated with a first service being upgraded where the second routine performs prepare cluster rollback work for the first service and wherein the second routine is invoked at integration point 2B in response to an upgrade error or failure occurring during the primary appliance 335's rollback window 322*a*. Generally, the second routine can perform processing to restore the appliances 355-338 to their pre-upgrade state and can include undoing processing performed by the first routine.

In at least one embodiment, the user provided code module or routine associated with integration point 2B can be invoked by the upgrade infrastructure when a cluster level rollback occurs such as due to an upgrade failure within the primary appliance's upgrade rollback window 322*a*. As part of implementing the cluster level rollback, the infrastructure code can call the user provided code module or routine associated with integration point 2B which can include restoration work to restore the appliances 335-338 to their pre-upgrade states. For example, the user provided code module or routine associated with integration point 2B can undo or reverse processing previously performed in connection with integration point 2A such as, for example, restarting, enabling or resuming any feature, service or facility previously stopped, disabled or paused in connection with the integration point 2A. The user provided code module or routine associated with integration point 2B can, for example, move any VMs, containers or applications back to their original pre-upgrade node configuration where such VMs, containers or applications were previously reconfigured for placement on different nodes by another user provide code module or routine executed in connection with integration point 2A.

The element 350 denotes a cluster rollback window which extends through the primary appliance rollback window 322a. If an error or failure occurs in connection with the upgrade workflow processing within the time window 350, a cluster level rollback can be performed. The cluster level rollback can include the infrastructure code invoking the one or more user provided code modules of integration point 2B, where the user provided code modules of integration point 2B are associated with one or more features being upgraded. In at least one embodiment, if the primary appliance rollback fails (e.g., such as when a failure occurs during execution of a user provided code module of integration point 2B), the cluster can remain in a degraded state.

The element 352 denotes a cluster rollforward window. If any error or failure occurs during the upgrade workflow in the window 352, the cluster can remain in a degraded state.

In at least one embodiment, the core cluster upgrade phase 326 can generally include installing and running the upgraded versions of the software and/or data for features, services or facilities being upgraded on the appliances of the cluster.

With reference to the time line L1, the appliance A1 335 can be upgraded in the time window T5a -T5b. The appliance A2 336 can be upgraded in the time window T5c-T5d. The appliance A3 337 can be upgraded in the time window T5e-T5f. The appliance A4 338 can be upgraded in the time window T5g-T5h.

In at least one embodiment in the core cluster upgrade phase 326, the upgrade infrastructure code can perform processing to upgrade each of the appliances 335-338 individually and sequentially in the time order illustrated, and also invoke any user specified or user provided code for the integration points 3A, 3B, 4A and 4B. Within each dual node appliance that is upgraded, the upgrade infrastructure code can perform processing to upgrade each node individually and sequentially and also invoke any user specified or user provided code for the integration points 3A, 3B, 4A and 4B that is applicable to the particular appliance upgraded (e.g., some integration points such as 4A and 3B may only be applicable to the primary appliance 335 as discussed below).

The appliance A1 335 is also sometimes be referred to herein as the primary appliance in that it is the initial or first appliance of the cluster to be upgraded. In particular in the phase 326, a first node of the appliance A1 335 can be upgraded from a current version V1 to a version V2 of a feature, service or appliance. Subsequently, the first node of the appliance A1 335 can be rebooted or restarted with the version V2 running but where the first node performs processing in a compatibility mode to operate in accordance with the prior version V1 (e.g., thus any features or services running operate in accordance with the version V1 compatibility). While the first node of the appliance A1 335 is being upgraded and prior to restarting, the first node fails over to the second node where the second node can perform processing to service all requests of the appliance A1 335. Once the first node of the appliance A1 335 has been upgraded to V2 and restarted, the second node of the appliance A1 335 goes offline, fails over to the first node while the second node is being upgraded from V1 to V2, and then restarts in a manner similar to that as described for the first node of the appliance A1 335. Once the appliance A1 335 has completed upgrading and restarting both of its nodes, the appliance A2 336 can similarly perform a node by node upgrade in the phase 326 in a manner as described for the appliance A1 335. Once the appliance A2 336 has completed upgrading and restarting both of its nodes, the appliance A3 337 can similarly perform a node by node upgrade in the phase 326 in a manner as described for the appliance A1 335. Once the appliance A3 337 has completed upgrading and restarting both of its nodes, the appliance A4 338 can similarly perform a node by node upgrade in the phase 326 in a manner as described for the appliance A1 335. Thus, in at least one embodiment, the appliances 335-338, and nodes thereof, can be upgraded individually in a sequence in the phase 326 as denoted in FIG. 3.

In the time window from T2-T3, the software and data version upgrade from V1 to V2 can be performed in the core cluster upgrade phase 326 in a sequential manner across the appliances 335-338. Thus during the time window T2-T3, the cluster of 4 appliances 335-338 can be characterized as running mixed versions V1 and V2 of the software and data until the upgrade from V1 to V2 is completed for the last or 4th appliance A4 338. In at least one embodiment, even though the appliances of the system can be running mixed versions of the software and data such as in the time window T2-T3, all appliances are operating in accordance with the current or old version V1 so that all appliances operate in accordance with the current or old version V1 even though they may have been upgraded to run V2 software. Those appliances which have been upgraded and are running the V2 software and have a V2 version and schema of data in the time window T2-T3 operate in a compatibility mode to perform processing and use an appropriate version and schema of data compatible with V1. Put another way, although an appliance may have been upgraded to run and use version V2 of software and data, the appliance operates in a runtime or execution compatibility mode in accordance with the V1 software and V1 data. In at least one such embodiment when operating in compatibility mode, any changes to a feature, service or facility in V2 can be disabled in an appliance. Furthermore, when in operating in compatibility mode, although data can be modified in V2 and/or the existing V1 data schema modified in V2, the appliance can operate using the V1 compatible data and the V1 data schema. For example in at least one embodiment, the appliance can retain the V1 data and its schema even though the appliance may also have thereon a V2 data and associated schema so that, when operating in compatibility mode, the appliance can use the V1 data and schema. Subsequently, the upgraded V2 feature using the V2 software and data can be enabled, such as integration point 9 discussed below, once the cluster or complete system upgrade has completed and is committed.

In at least one embodiment in the phase 324, the appliances 335-338 only have existing V1 software and data installed thereon and thus perform processing and execute in accordance with the existing V1.

In at least one embodiment in the phase 326, the cluster can have mixed versions V1 and V2 installed and running on the appliances 335-338, depending on the current point in time of the upgrade. During the phase 326, appliances of the cluster all operate (e.g., perform runtime processing and execute) in accordance with the existing V1. If a node or appliance has V2 installed and running thereon, that node or appliance can operate in a V1 runtime compatibility mode (sometimes referred to simply as compatibility mode) as discussed elsewhere herein. Thus in the phase 326, the upgraded V2 features can be characterized as disabled. As discussed in the following paragraphs, such upgraded V2 features can be subsequently enabled at integration point 9 of the phase 328.

In at least one embodiment in the phase 328, the upgraded version V2 of the software is installed and running on all the nodes of all the appliances where any final modifications to the data (e.g., database schemas and data transformations) are made in the phase 328 at the integration points 5B and 6 prior to the integration point 9.

In at least one embodiment, the cluster appliance upgrade can be characterized as committed once the processing associated with the integration point 6 has completed whereby the upgraded V2 features can be enabled in the integration point 9. Thus, subsequent to integration point 9 of the phase 328, all appliances no longer perform processing in the V1 runtime compatibility mode. Rather, the V1 runtime compatibility mode can be disabled and the appliances now operate and perform processing based on the upgraded V2 code and data. In at least one embodiment as illustrated in FIG. 3 after completion of processing associated with integration point 6, the new V2 software has been installed on all the appliances 335-338 of the cluster and data associated upgrade V2 work has also been completed on all the appliances 335-338. In such an embodiment after integration point 6, additional cluster upgrade work can be completed by the upgrade infrastructure or framework and also by user code routines or modules associated with integration points 7, 8 and 9 before the cluster upgrade work can be characterized as committed. In such an embodiment, the entire cluster upgrade can be characterized as committed after completion of associated processing for integration point 9 when all the upgrade work for the entire cluster has been completed.

As can be seen in FIG. 3, the integration points 3A, 3B, 4A and 4B are included in the core cluster upgrade phase 326. In at least one embodiment, the integration points 3A, 3B, 4A and 4B can be associated with upgrade workflow processing for an appliance occurring after the appliance has been upgraded with the V2 software and data. In other words, the user provided code modules or routines associated with the integration points 3A, 3B, 4A and 3B are invoked and execute on an appliance after the appliance has been upgraded with the V2 code and data for the one or more features, services or facilities. In at least one embodiment, code modules or routines associated with the integration points 3A, 3B, 4A and 4B can be executed on the primary appliance 335, and code modules or routines associated with the integration points 3A and 4B can be executed on the secondary appliances 336-338 (e.g., integration points 3B and 4A may not be associated with processing performed on the secondary appliances 336-338).

In at least one embodiment, the data storage system including the 4 appliances 335-338 can have one or more cluster-wide databases which include information used by all appliances of the data storage system. In such an embodiment, the management database 331 can be a system-wide or cluster-wide database which includes the data storage system configuration information discussed elsewhere herein, where the data storage system configuration information describes the current configuration of the data storage system. For example, the management database 331 can include information regarding the physical and logical entities in the data storage system, and can include configuration information identifying the particular appliances in the cluster. In at least one embodiment, the element 331 can denote the primary copy of the management database 331 stored on the primary appliance 335. Each of the remaining appliances 336-338 can include a local copy (not illustrated) of the management database 331 used for processing by the particular appliance. An embodiment can use any suitable mechanism to synchronize the management database 331 and local copies thereof on the appliances 335-338. Generally the management database 331 can be characterized as system-wide or cluster-wide in that it includes information relevant to the entire system or cluster.

Each of the appliances 335-338 can also include appliance level local databases (sometimes referred to simply as local databases) which can include information generally only applicable to the particular local appliance. In at least one embodiment, each appliance 335-338 can persistently store information in an appliance level local database which includes, for example, performance and workload statistics for the different LUNs configured on the BE PDs local to the appliance, and appliance level state and configuration information. The appliance level state information can describe, for example, the current progress of the upgrade with respect to the particular appliance, where the appliance level state information can also be duplicated or shadowed in the management database so that the management database 331 can describe a cluster view of the upgrade state.

The integration point 3A can be referred to as the "local database schema upgrade" integration point. The integration point 3A can be used to perform work to update the schema or structure of a local database of an appliance. The schema or structure update to the local database can include, for example, adding or removing a table from the local database, adding or removing a column from an existing table in the local database, and the like. In at least one embodiment, a user provided code module can update or modify the local database schema of local databases of the appliances 335-558 at the integration point 3A, where the user provided code module of integration point 3A can be invoked by the infrastructure code as described in more detail elsewhere herein.

The integration point 3B can be referred to as the "management database schema upgrade" integration point. The integration point 3B can be used to perform work to update the schema or structure of the management database 331, or more generally the cluster-wide or system-wide database with its primary copy stored on the primary appliance 335. Thus, in at least one embodiment, the integration point 3B can be applicable only to the primary appliance 335. In at least one embodiment, a user provided code module can update or modify the schema or structure of the management database 311 at the integration point 3B, where the user provided code module of integration point 3B can be invoked by the infrastructure code as described in more detail elsewhere herein.

With respect to the primary appliance 335, the integration points 3A and 3B can be associated with upgrade workflow processing points after the control path is restarted on the primary appliance using the upgraded version V2 of the upgraded software running on the primary appliance 335. In at least one embodiment, the control path can be used to perform the schema changes to the management database 331 (e.g., integration point 3B) and the primary appliance's local database (e.g., integration point 3A). Thus, a first user provided code module or routine associated with integration point 3A and second user provided code module or routine associated with integration point 3B can be invoked by the infrastructure code and executed on, or with respect to, the primary appliance 335 to perform schema or structure changes to the local database and the management database of the primary appliance 335.

With respect to each of the remaining secondary appliances 336-338, the integration point 3A can be associated with an upgrade workflow processing point after the control path is restarted on each secondary appliance using the upgraded version V2 of the upgraded software running on the secondary appliance. In at least one embodiment, the control path can be used to perform the schema changes needed each appliance's local database. Thus, a first user provided code module or routine associated with integration point 3A can be invoked by the infrastructure code and executed on, or with respect to, each of the secondary appliances 336-338 to perform schema or structure changes to the local database of each such appliance.

The integration point 4A can also be referred to as the "primary appliance upgrade resume services" integration point. The integration point 4A can be used if a particular feature, service or facility is required to run on the cluster during the upgrade. As noted above in at least one embodiment, it can be recommended that only critical features, services or facilities run during the upgrade. In the event a feature, service or facility does run during the upgrade workflow processing, then the feature, service or facility operates or executes in accordance with the compatibility mode for the mixed version cluster. In at least one embodiment, upgrade workflow processing performed at the integration point 4A can include, for example, restarting, resuming or enabling a service that runs on the primary appliance 335, where the service can be a cluster service controller or orchestrator software component that schedules work on all appliances 335-338 of the cluster. Thus in such an embodiment, starting a service in connection with integration point 4A starts the service for use with all the appliances 335-338, or more generally, the entire cluster. For example, a replication service can be restarted by a user code module or routine at integration point 4A on the primary appliance 335 where the replication service can also schedule other work or processing, as may be needed, that is performed on the remaining secondary appliances 336-338.

The integration point 4A can be associated with upgrade workflow processing performed on only the primary appliance 335 after the primary appliance 335 has been successfully upgraded with the V2 software and after the database schema of the management database 331 stored on the primary appliance 335 has been upgraded in connection with V2 database schema changes associated with integration point 3B. The integration point 4A can be associated with a user provided code module or routine, for example, that resumes or restarts an upgraded service on the primary appliance 335 after the service software on the appliance 335 has been successfully upgraded from V1 to V2 and after the database schema of the management database 331 has been upgraded from V1 to V2 schema changes associated with the integration point 3B. In at least one embodiment, any work or processing performed by the user provided routine associated with the integration point 4A can be local to the appliance 335 and cannot, for example, use any cluster-wide commands or operations since the cluster appliances can be running mixed versions V1 and V2 of code of features being upgraded. The infrastructure code can invoke the user provided routine associated with integration point 4A after the primary appliance has been successfully upgraded to use the V2 software and after the V2 database schema upgrade of the management database 331 associated with the integration point 3B has been completed. For example, assume a service has been upgraded from V1 to V2 and the service is required to run during the upgrade process. In this case, the user provided routine associated with integration point 4A can start or run the upgraded V2 service in the compatibility mode so that the upgraded service performs processing at runtime in accordance with the prior version V1 of the service (e.g., as prior to the upgrade) and also the prior version V1 of the database schema of the management database. In at least one embodiment, the user provided routine associated with integration point 4A can only be executed on the primary appliance 335.

The integration point 4B can be associated with upgrade workflow processing performed on each of the appliances 335-338 after the appliance has been successfully upgraded. Generally, the integration point 4B can be associated with customized upgrade work which integrates the upgraded feature, service or facility with other components on the appliance (e.g., after the feature, service or facility has been upgraded on the appliance). The integration point 4B can be associated with a user provided code module or routine, for example, that resumes or restarts an upgraded service on one of the appliances such as 336 after the service software on the appliance 336 has been successfully upgraded such as from a prior version V1 to version V2. Consistent with discussion elsewhere herein, in this case, the upgraded service can be restarted to operate and run in a compatibility mode in accordance with the prior version V1 (e.g., software and data). Any work or processing performed by the user provided routine associated with the integration point 4B can be local to the particular appliance upon which the routine is executed. For example, the work or processing performed by the user provided routine associated with the integration point 4B can include establishing communications between different containers or VMs within the same appliance so that such containers or VMs can communicate with one another. The work or processing performed by the user provided routine associated with the integration point 4B cannot, for example, use any cluster-wide commands or operations since the cluster appliances can be running mixed versions V1 and V2 of code of features being upgraded. For each of the appliances 335-338, the infrastructure code can invoke the user provided routine associated with integration point 4B and execute the routine on each such appliance after the appliance has been successfully upgraded.

The expanded cluster upgrade phase 328 can include data migration processing 340, expanded cluster upgrade processing 342 and finalize upgrade processing. Generally in at least one embodiment, the data migration processing 340 can include providing further schema database updates such as to the management database and/or appliance local databases, and can include performing processing to transform, migrate or convert existing content of the management database and/or appliance local databases to use upgraded schemas. In at least one embodiment, the data migration processing 340 can include integration points 5A, 5B and 6 described in more detail below.

In at least one embodiment, the expanded cluster upgrade processing 342 can include installing new components; reconfiguring placement of the control path on a particular node of each appliance; restarting, resuming or enabling features, services or facilities that were previously stopped, paused or disabled in connection with prior integration points; and enabling the upgraded V2 features and the newly installed components. In at least one embodiment, the expanded cluster upgrade processing 342 can include the integration points 7, 8, and 9 described in more detail below.

In at least one embodiment, the finalize upgrade processing 344 can generally include any additional processing needed to finalize the upgrade. The element 344 can include, for example, performing cleanup processing for the upgrade such as deleting temporary files, releasing allocated memory used for holding in-memory temporary structures or information used in performing the upgrade, and the like.

The integration point 5A can be associated with processing performed to pause services prior to further management database schema updates (e.g., performed in connection with integration point 5B discussed below) and prior to performing migration or transformation of the existing content of the management database to use the upgraded V2 management database schema (e.g., performed in connection with integration point 6 discussed below).

The processing associated with integration point 5A can stop or pause a first service, for example, which may otherwise access and modify the management database while the management database is being upgraded in connection with processing of subsequent integrations points 5B and 6. If, for example, the first service continues running rather than being stopped or paused at integration point 5A, problems or issues (e.g., deadlock, data corruption, data inconsistencies, extended timeouts while attempting to perform an operation or task) can arise as a result of the first service accessing and/or modifying the management database at the same time other processing of integration points 5B and 6 is also trying the access and/or modify the management database.

A service that is paused or stopped in connection with integration point 5A can be restarted or resumed at the subsequent integration point 8. At the integration point 8, the service can be restarted when the appliances are running the upgraded V2 software and after the subsequent schema changes and data migration or transformation associated, respectively, with the integration points 5B and 6 have been completed. In at least one embodiment, a user provided code module or routine associated with integration point 5A and be invoked by the infrastructure code to pause, stop or disable one or more features, services or faciles.

For example, in at least one embodiment an upgrade can be performed to upgrade supported protocols by adding support for a storage access and transport protocol, such as NVMe (Non-volatile Memory Express), for SSDs. In connection with this upgrade, the management database schema can be modified at integration point 5B to add NVMe support such as add one or more new LUN attributes used with NVMe, and existing content of the management database can be migrated or transformed at integration point 6 to adapt to the existing data of the management database to the updated management database schema. In this case, a data replication service can be paused or stopped in connection with integration point 5A when the upgrade includes adding NVMe support as just described to avoid potential undesirable adverse consequences such as deadlock, data corruption or inconsistencies, extended operation timeouts, and the like. Such adverse consequences can result, for example, if the data replication service attempts to access and/or modify the same database structures (e.g., tables such as a volume table) and content which are also modified in connection with IP5B and IP6 to add NVME support.

The integration point 5B can be associated with processing performed to further modify the management database schema. In one aspect, the integration point 5B can be characterized as associated with a second chance to upgrade the management database schema after all appliances have been upgraded in the phase 326 to run the version V2 of the upgrade software. The integration point 3B can be associated with processing of a prior first chance to upgrade the management database schema. The integration 5B can be characterized as similar to the integration point 3B with the difference that the integration point 5B is done after all appliances have been upgraded to run the version V2 of the upgraded software. In at least one embodiment, there may be cases where upgrading the management database schema cannot be done at the integration point 3B, for example, due to the state of the upgrade processing at the integration point 3B. To further illustrate, for example, it may be that performing schema updates to the management database to add new LUN attributes for the NVMe support requires that all the appliances 335-338 run the upgraded V2 software which does not occur until the phase 328 (e.g., even though such V2 feature may not yet be enabled until the subsequent integration point 9). In this case, the necessary schema updates to the management database for the LUN attributes cannot be implemented in connection with the integration point 3B.

The integration point 6 can be referred to as the "data migration or data transformation" integration point. The integration point 6 can be associated with processing performed to migrate or transform the existing content of the management database to conform to the upgraded V2 management database schema. In at least one embodiment, the integration point 6 can be associated with processing performed to migrate or transform the existing content of the local databases of the appliances to conform to the upgraded V2 local database schema. The integration point 6 can be associated with a user provided code module or routine invoked by the infrastructure code, where the user provided code module or routines performed processing including, for example, transforming or converting existing data stored in the management database by reformatting such existing data in accordance with the upgraded V2 management database schema. For example, consider the case where the upgraded management database schema includes a new LUN attribute added to an existing LUN or volume table, where the volume table includes a record for each configured or provisioned LUN in the data storage system. The processing performed by the user provided module or routine associated with integration point 6 can include providing a default or new value for the new LUN attribute for all LUN records stored in the volume table. For example, consider adding the new LUN attribute in connection with NVMe support where the new LUN attribute is an identifier, such as an NGUID (Namespace Globally Unique Identifier), used in connection with the NVMe standard to identify each LUN. In this case, integration point 6 processing can include generating unique new NGUID values for all existing LUNs each having a corresponding record in the volume table of the management database.

In at least one embodiment, integration point 6 is associated with an upgrade workflow processing point where all the appliances are running the upgraded V2 software and after database schema upgrades for V2 are applied to the management database schema (e.g., reflecting schema updates associated with prior integration points 3B and 5B). It should be noted that although the appliances 335-338 are running the V2 software and the database schema upgrades for V2 are applied to the management database schema (e.g., reflecting schema updates associated with prior integration points 3B and 5B) at integration point 6, such appliances 335-338 are still operating in accordance with the V1 compatibility mode using the V1 runtime behavior and the V1 data compatibility (e.g., using the V1 database schema).

In at least one embodiment, the user provided code modules or routines associated with the integration point 5A can be executed on all the appliances, the user provided code modules or routines associated with the integration points 5B and 6 which modify the management database can be executed on the primary appliance 335; and the user provided code modules or routines associated with the integration points 5B and 6 which modify the local databases can be executed on each of the appliances 335-338.

The integration point 7 can be associated with processing performed to install a new component, such as a new feature, service or facility. It should be noted that the component installed at the integration point 7 can be characterized as new in that the new component did not exist in the prior version V1 on the system prior to the upgrade. Put another way, for the new component being installed, this is the initial installation of the new component on the system. Further installing the new component may not be considered a modification or an upgrade to an existing V1 component such as an existing V1 feature, service or facility.

In at least one embodiment, the new component may further require that all appliances of the system already have been upgraded to the V2 software and data where the upgraded V2 software and data have been enabled (e.g., perform runtime processing in accordance with V2 runtime behavior and data schema). As an example, a new component can be installed in connection with integration point 7 which performs data replication to the cloud, where data is replicated from the data storage system to external cloud-based storage or simply "the cloud". Cloud storage is a cloud computing model that stores data on the Internet through a cloud computing provider which manages and operates data storage as a service. Cloud-based data storage can be delivered on demand with just-in-time capacity and costs, and eliminates buying and managing your own data storage infrastructure. With cloud storage, data is stored in logical pools, said to be on "the cloud". The physical storage of the logical pools of cloud-based storage can span multiple data storage systems and multiple data centers typically owned and managed by a storage provider or hosting company.

In at least one embodiment, processing performed by a user provided code module or routine invoked at integration point 7 can, for example, perform customized processing to install the new component on the appliances of the cluster. As noted above in at least one embodiment, the initial or first time installation of the new feature, facility or service can have a requirement to be installed appliances currently running the upgraded version V2 software and data, where such V2 features are currently enabled on the appliances providing V2 runtime compatibility. In other words in at least one embodiment, the new service may have an installation requirement in that the new service can only be installed on a data storage system currently running the upgraded version V2 of software (e.g., even though such V2 features have not yet been enabled).

To further illustrate, consider the following example. In order to support replication to the cloud in at least one embodiment, the data storage system itself may have to first be upgraded to use V2 software. The V2 software can, for example, support a new set of internally used APIs which are not supported in the prior V1 version of software and data. The new internally used APIs can be enabled for use with the new replication to the cloud service within the V2 software while still operating in accordance with the V1 compatibility mode (e.g., where the system operates in accordance with the V1 runtime behavior and V1 data schema). The new feature or service of replication to the cloud may use the new set of APIs included in the upgraded V2 software and thus require that the V2 software be installed on the appliances 335-338 prior to installation of the new replication to the cloud service. Depending on the embodiment, the new internally used APIs (e.g., such as used internally within the data storage system or cluster) can be enabled for use at integration point 7 as opposed, for example, to other new V2 APIs that can be used or exposed externally for use outside of the cluster. In this case, the internally used APIs can be contrasted with the other new V2 APIs which can be characterized as external and may not be enabled at integration point 7.

In at least one embodiment, such new components are added at integration point 7 after completion of integration point 6 processing whereby all appliances have been upgraded to use the upgraded V2 software and V2 database schema. In this manner, the new components can be installed on a stable upgraded cluster running the V2 software and V2 database schema. (e.g., V2 upgrades applied in connection with integration points prior to integration point 7). In at least one embodiment, if a new component installed at integration point 7 requires utilization of a new V2 API, or more generally other V2 functionally, not yet enabled at integration point 7 but rather where the new V2 API (or other V2 functionality) is enabled at integration point 9, a first user provided routine or code module invoked at integration point 9 can invoke or call back to a second user provided routine or code module associated with integration point 7 to configure or enable the new component after the new V2 API (upon which the new component depends) is itself enabled.

In at least one embodiment, the new component (e.g., new feature, service or facility) can be installed at the integration point 7 across the nodes of the multiple appliances 335-338 of the system in rolling sequential manner as discussed above in connection with performing an upgrade to a feature, service or facility in the phase 326.

In at least one embodiment, the newly installed components in connection with integration point 7 may not yet be enabled until the subsequent integration point 9 discussed below.

In at least one embodiment, each appliance can run an instance of the control path on one of the nodes of the appliance. In such an embodiment, one of the control path instances running on the appliances can be designated as the primary control path instance which receives incoming control path or management requests and communicates with external management clients, for example, such as the data storage system management application. The primary control path instance can be a driver or main control path instance which distributes control path or management requests to other control path instances on other appliances. For example, the primary control path instance can run on the primary appliance 335 where the primary control path can communicate with 3 control path instances respectively on the appliances 336-338.

In at least one embodiment, there can be a default node upon which the control path instance executes on each appliance. For example, each appliance can include 2 nodes designated as node A and node B. A default or static assignment can be made so that the control path instance of each appliance 335-338 runs on node A of the appliance.

The integration point 8 can be referred to as the "post cluster upgrade control path node preference" integration point. The integration point 8 can be used to dynamically manage and configure placement of the control path instance on each of the individual appliances 335-338.

The work or processing performed by a user provided routine associated with the integration point 8 can place or locate the control path instance of each appliance on a particular node of the appliance. For example, the user provided routine associated with the integration point 8 can locate and run a control path instance on node A of each of the appliances 335 and 337, and locate and run a control path instance on node B or each of the appliances 336 and 338. For each of the appliances 335-338 in at least one embodiment, the infrastructure code can invoke the user provided routine associated with integration point 8 and execute the routine on each such appliance. As an alternative in at least one embodiment, the user provided routine associated with integration point 8 can execute the routine, for example, on one of the appliances and then communicate with the other appliances to control placement of the control path instances across appliances of the cluster.

The integration point 9 can be referred to as the "expanded cluster upgrade resume services and enable new features" integration point. The integration point 9 corresponds to an upgrade workflow processing point where a feature, service or facility can be restarted. For example, a first service may have been previously stopped, paused or disabled in connection with the prior integration point 2A or 5A. The first service can now be restarted or enabled at the integration point 9 by processing performed by a user provided routine associated with the integration point 9. Additionally, the integration point 9 corresponds to an upgrade workflow processing point where the new or upgraded features, services or facilities can be enabled. Consistent with other discussion herein, during the upgrade prior to the integration point 9 (e.g., such as in the phase 326), the cluster runs in a V1 compatibility mode where new or upgraded V2 features are not enabled. The new or upgraded V2 features, services or facilities can now be enabled at integration point 9 by processing performed by a user provided routine associated with the integration point 9. In at least one embodiment, the infrastructure code can invoke the user provided routine associated with integration point 9 and execute the routine on each of the appliances 335-338. As an alternative in at least one embodiment, the user provided routine associated with integration point 9 can execute the routine, for example, on one of the appliances and then communicate with the other appliances to enable the new or upgraded features, services or facilities across all appliances of the cluster.

In at least one embodiment, once a new or upgraded feature, service or facility is enabled in connection with integration point 9, the appliances no longer run in V1 compatibility mode and rather execute and perform processing in accordance with the upgraded V2 version runtime behavior. If the upgrade includes modifications to the database schema, the upgraded or modified version V2 of the database schema can be used. Additionally in at least one embodiment, the new components installed at integration point 7 can also be enabled at the integration point 9.

Figure 4:
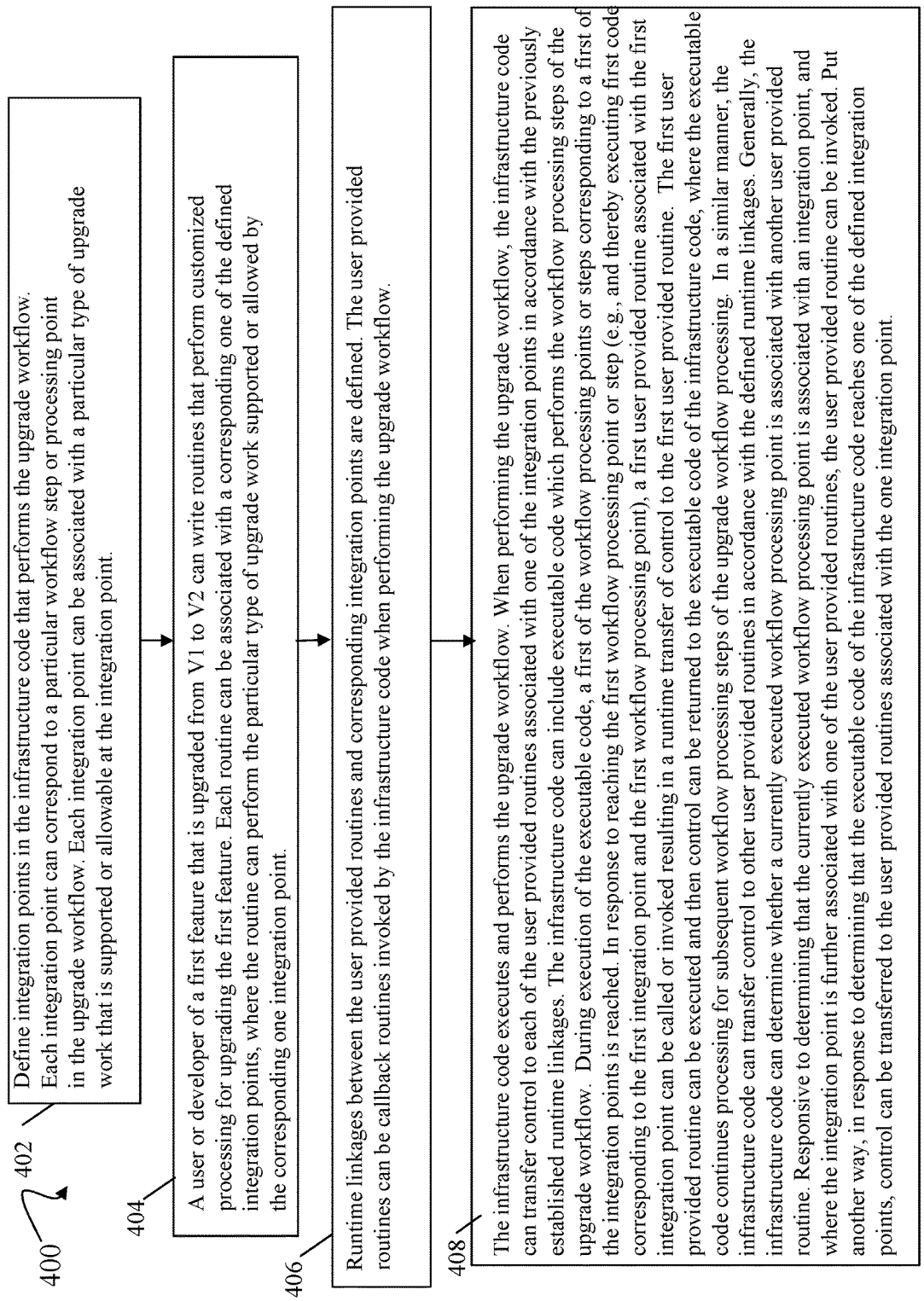

Referring to FIG. 4, shown is a flowchart 400 of processing steps that can be performed in an embodiment in accordance with the techniques of the present disclosure. The flowchart 400 summarized processing described above.

At the step 402, integration points can be defined in the infrastructure code that performs the upgrade workflow. Each integration point can correspond to a particular workflow step or point in the upgrade workflow. Each integration point can be associated with a particular type of upgrade work that is supported or allowable at the integration point. From the step 402, control proceeds to the step 404.

At the step 404, a user or developer of a first feature that is upgraded from V1 to V2 can write routines that perform customized processing for upgrading the first feature. Each routine can be associated with a corresponding one of the defined integration points, where the routine can perform the particular type of upgrade work supported or allowed by the corresponding one integration point. From the step 404, control proceeds to the step 406.

At the step 406, runtime linkages between the user provided routines and corresponding integration points are defined and established or instantiated. The runtime linkages can be defined using an API where another user provided routine executes and performs a call to the infrastructure code using the API to establish or instantiate the runtime linkages. The API can be used to define the runtime linkages using parameters associating each of the user provided routines with the corresponding one of the defined integration points. The user provided routines can be callback routines invoked by the infrastructure code when performing the upgrade workflow. From the step 406, control proceeds to the step 408.

At the step 408, the infrastructure code executes and performs the upgrade workflow. When performing the upgrade workflow, the infrastructure code can transfer control to each of the user provided routines associated with one of the integration points in accordance with the runtime linkages established in the prior API call. The infrastructure code can include executable code which performs the workflow processing steps of the upgrade workflow. During execution of the executable code, a first of the workflow processing points or steps corresponding to a first of the integration points is reached. In response to reaching the first workflow processing point or step (e.g., and thereby executing first code corresponding to the first integration point and the first workflow processing point), a first user provided routine associated with the first integration point can be called or invoked resulting in a runtime transfer of control to the first user provided routine. The first user provided routine can be executed and then control can be returned to the executable code of the infrastructure code, where the executable code continues processing for subsequent workflow processing steps of the upgrade workflow processing. In a similar manner, the infrastructure code can transfer control to other user provided routines in accordance with the defined runtime linkages. Generally, the infrastructure code can determine whether a currently executed workflow processing point is associated with another user provided routine. Responsive to determining that the currently executed workflow processing point is associated with an integration point, and where the integration point is further associated with one of the user provided routines, the one user provided routine can be invoked. Put another way, in response to determining that the executable code of the infrastructure code reaches one of the defined integration points, control can be transferred to one of the user provided routines associated with the one integration point.

Figure 5:
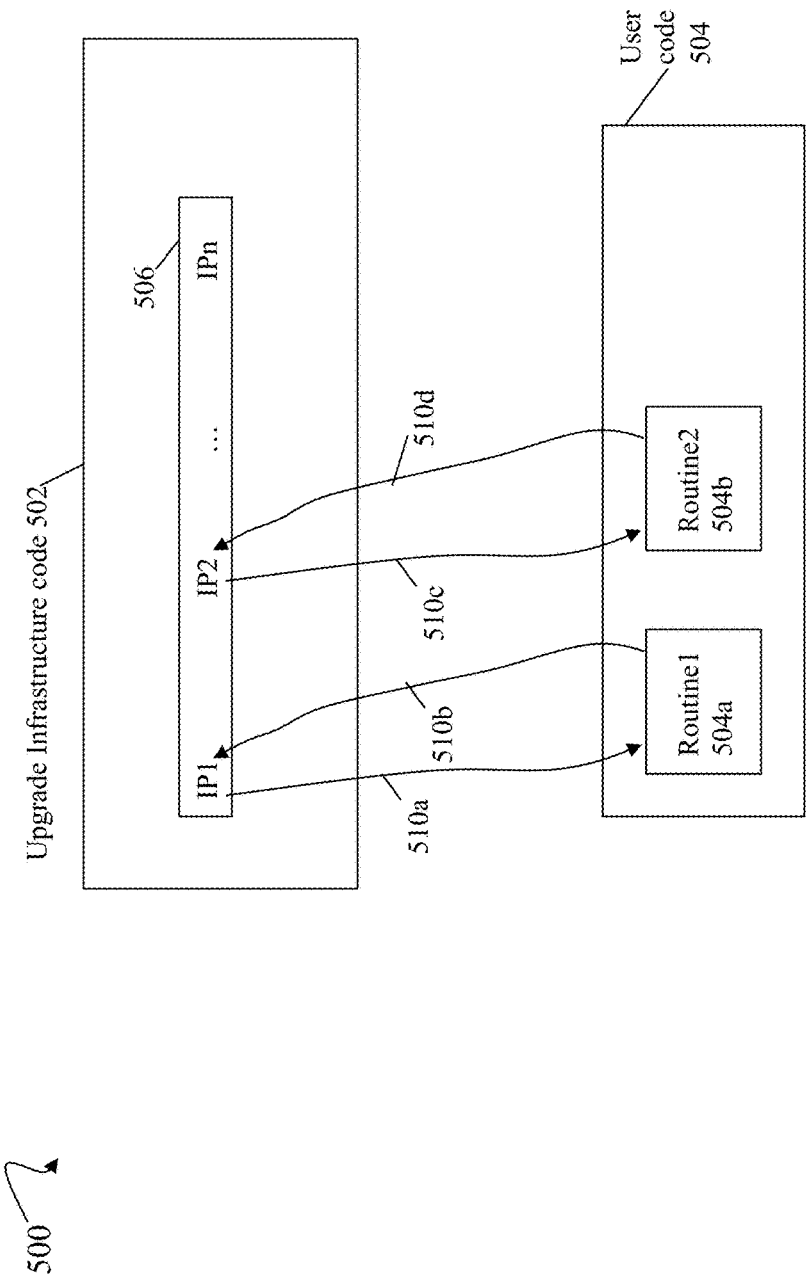
FIG. 5 is an example illustrating use of callbacks from upgrade infrastructure code to user provided routines in an embodiment in accordance with the techniques of the present disclosure.

Referring to FIG. 5, shown is an example 500 illustrating use of callbacks to user provided routines in an embodiment in accordance with the techniques of the present disclosure.

The example 500 includes the upgrade infrastructure code 502, defined integration points (IPs) 506, and user code 504. The user code 504 includes routine 1 504a and routine 2 504b. An established runtime linkage can exist between integration point (IP)1 and the routine 1 504a. Another established runtime linkage can exist between IP2 and the routine 504b. The upgrade performance infrastructure code 502 can be executed to perform the workflow processing steps of the upgrade workflow such as described and illustrated in connection with FIG. 3. At runtime while executing the upgrade infrastructure code 502, a first workflow processing step or point of the upgrade workflow corresponding to the IP1 can be reached. In response to reaching the first workflow processing point or step corresponding to the IP1 during the executing of the code 502, runtime control can be transferred 510a from the IP1 to the routine 504a in accordance with the established runtime linkage between IP1 and 504a. Once the routine 504a has completed execution, control can be returned 510b to the code 502. The code 502 can continue execution with other workflow processing steps of the upgrade workflow. Subsequently, at runtime while executing the upgrade infrastructure code 502, a second workflow processing step or point of the upgrade workflow corresponding to the IP2 can be reached. In response to reaching the second workflow processing point or step corresponding to the IP2 during the executing of the code 502, runtime control can be transferred 510c from the IP2 to the routine 504b in accordance with the established runtime linkage between IP2 and 504b. Once the routine 504b has completed execution, control can be returned 510d to the code 502. The code 502 can continue execution with other workflow processing steps of the upgrade workflow.

Although FIG. 5 illustrates only a single user provided routine being invoked at a single IP, more generally in at least one embodiment, one or more routines can be associated with a single IP and invoked when the upgrade workflow processing reaches the single IP.

Described above are embodiments of an upgrade infrastructure with strategically placed IPs that provide for improved stability when performing a cluster upgrade across multiple systems of nodes. The IPs guide a feature owner or developer wishing to perform an upgrade to various corresponding IPs corresponding to workflow processing points in the upgrade where specific types of work are supported. In at least one embodiment, the upgrade infrastructure guides a feature owner or developer to the proper places or processing points in the upgrade workflow processing at which various types of upgrade work can be performed in order to prevent, for example, runtime errors, collisions with other services and data, and also to ensure, for example, successful coordination during the upgrade between dependencies. To further illustrate with reference back to element 360 of FIG. 3, cluster data upgrades are supported at IPs 3A, 3B, 5B and 6. With reference back to FIG. 3 in at least one embodiment, database schema upgrades can be supported at IP 5B but cluster data transformation can be supported only at IP 6. The foregoing ordering can ensure data transformation can only take place after database schema upgrade is complete and to ensure that data transformation is complete before new feature behavior is enabled, for example, at IP 9. If upgrade work is not done properly, the cluster upgrade can fail or become unstable which can cause downtime and/or data-loss.

In at least one embodiment, the foregoing upgrade infrastructure framework and associated IPs such as described in connection with FIG. 3 can support upgrading particular cluster software having a specific structure and which operates based on a particular set of characteristics. However, additional IPs may be needed to fully support upgrading additional cluster software that may not operate based exclusively on the same specific structure and characteristics thereby needing the additional IPs.

For example, the upgrade infrastructure framework can have an associated upgrade workflow and IPs tailored for first cluster software that can be base system cluster software providing a first set of base or basic functionality. For example, the first cluster software can provide functionality including, for example, a base system and including one or more data storage services such as block storage services (e.g., read and write I/Os directed to block storage devices such as LUNs or more generally logical devices). The first cluster software can be installed and then upgraded on a cluster of appliances such as discussed in connection with FIG. 3. In at least one embodiment, one or more other layered products or other additional software clusters, such as second cluster software, can also be installed on the cluster of appliances in addition to the first cluster software. The second cluster software can be, for example, NAS (network attached storage) cluster software installed in, or on top of, the base system cluster software. In at least one embodiment, the NAS or other second cluster software can generally be a file-based storage architecture. In at least one embodiment, the base system cluster software can be structured in accordance with the particular hardware components, such as appliances, forming the hardware cluster of appliances being upgraded. Thus in at least one embodiment, upgrading the cluster can include upgrading each appliance of the hardware cluster to an upgraded version of the base system cluster software and also upgrading each appliance of the hardware cluster to an upgraded version of the NAS or other second cluster software. In at least one embodiment, the upgrade infrastructure framework such as described in connection with FIG. 3 can facilitate upgrading the first cluster software providing the base system cluster based on one or more particular characteristics. For example, the first cluster software can include a first cluster manager that is a software component which always executes on the primary appliance 335 and does not execute on any of the secondary appliances 336, 337 or 338. In contrast, the second cluster software, such as the NAS cluster software, can include a second cluster manager that is installed software executing on any one of the appliances 335, 336, 337 and 338. Furthermore in some embodiments, the particular appliance on which the second cluster manager executes can vary and can change during the lifetime in which the second cluster software runs on the appliance cluster. For example, due to a high availability (HA) event or other event, the second cluster manager can be located on one of the secondary appliances 336-338 rather than the current primary appliance A1 335. More generally, the first cluster manager and the second cluster manager can be located on different appliances of the cluster rather than the same appliance. In connection with performing an upgrade, it can be necessary for the different cluster managers to communicate with one another in connection with general cluster management and to coordinate upgrade processing and associated upgrade states among the two or more independent software clusters. In at least one embodiment, the upgrade infrastructure framework may be sufficient for use with upgrading the foregoing first or base system cluster software alone but may be insufficient for use with upgrading both the first and second software clusters, such as where the second cluster software is NAS cluster software with a cluster manager that may generally be located and execute on any one of the multiple appliances 335, 336, 337 and 338 being upgraded. In at least one embodiment the particular appliance upon which the NAS cluster manager executes can vary and, further, the NAS cluster manager can move over time among the multiple appliances 335, 336, 337 and

338 being upgraded. Thus in at least one embodiment, the NAS cluster manager and the base system cluster manager can both be located on different appliances of the configured cluster of appliances being upgraded.

In particular, in at least one embodiment, the first or base cluster software can manage cluster prepare and rollback behavior, for example, using IPs 2A and 2B discussed above in connection with FIG. 3. However, IPs 2A and 2B, and other defined IPs of FIG. 3, may collectively be insufficient to support and manage cluster prepare and rollback behavior as well as other behavior of the second cluster software, such as the NAS cluster software noted above, having different upgrade requirements or characteristics and structure than the first or base system cluster software. For example in at least one embodiment, the NAS cluster software or other additional cluster software installed on top of the base cluster software may need to perform preparation processing immediately before upgrading one or more of the secondary appliances 336-338. Thus in at least one embodiment, the NAS cluster can utilize a first IP, such as IP 2C discussed herein and illustrated in FIG. 6, that can be called immediately prior to upgrading each secondary appliance 336-338. In at least one embodiment, such preparation processing performed at IP 2C prior to upgrading a secondary appliance such as A2 336 can relate to the appliance level upgrade of A2 from V1 to V2 for the NAS cluster software.

As another example, in at least one embodiment, the NAS cluster software or other additional cluster software installed on top of the base cluster software may need to perform additional rollback processing tasks or work at the secondary appliance level after a secondary appliance level rollback (such as from V2 to V1) of at least the base system software and/or NAS cluster software has been successfully performed. In at least one embodiment, a secondary appliance level rollback can be performed in response to a secondary appliance upgrade failure (such as when upgrading a secondary appliance from V1 to V2 for one or more software clusters) that occurs within the corresponding appliance rollback window of the particular secondary appliance. For example, when upgrading appliance A2 336 from V1 to V2 for the base system and NAS software clusters, an upgrade failure can occur during the appliance level rollback window 322*b* thereby triggering a rollback of appliance A2 336 from V2 to V1 due to the upgrade failure. Assuming the V2 to V1 base system and NAS software cluster rollback of appliance 336 succeeds, in at least one embodiment the NAS cluster software may need to perform additional rollback tasks or work immediately after the rollback of appliance A2 336. Thus in at least one embodiment, the NAS cluster can utilize a second IP, such as IP 2D discussed herein and illustrated in FIG. 6, that can be called immediately after successful rollback of any secondary appliance 336-338. In at least one embodiment, such rollback processing tasks or work performed at IP 2D after successfully rolling back the base system and the NAS cluster software from V2 to V1 on the secondary appliance such as A2 336 can relate to the appliance level rollback of A2 from V2 to V1 for the NAS cluster software and/or a cluster level rollback or cluster level state with respect to the NAS cluster software. In at least one embodiment, the base system cluster software may not utilize the additional IP 2C and IP 2D. However, in at least one embodiment, the NAS cluster software may utilize one or more of the additional integration points, IP 2C and/or IP 2D, to properly manage the behavior of the NAS cluster in connection with secondary appliance rollbacks of the base system and NAS clusters, and in connection with the current NAS cluster state or mode as communicated to, and managed by, the NAS cluster manager.

As such, described below is an additional set of IPs, including IP 2C and IP 2D, that can be included in the upgrade infrastructure framework in at least one embodiment to thereby extend the upgrade infrastructure framework to provide the same stability for upgrading additional multiple, independent software clusters, such as the second cluster software or NAS cluster software, that can have different upgrade requirements and/or characteristics than the first or base cluster software.

In at least one embodiment, each of the additional software clusters, such as the NAS cluster, can be installed on top of the first or base cluster software and can have their own independent cluster architectures that require upgrade operations to take place based on characteristics or requirements which are different than the first or base cluster software.

In at least one embodiment, use of the additional set of IPs in the upgrade infrastructure framework allows for upgrading various types of software cluster architectures and orchestrating multiple cluster software upgrades simultaneously. For example, in at least one embodiment as noted above, the NAS cluster controller or manager can reside on any node and any appliance in a cluster. In at least one embodiment, the NAS cluster controller or manager, that manages the upgrade of the NAS cluster software, may not be installed on the primary appliance with the base system cluster manager. Accordingly in at least one embodiment, upgrading the NAS cluster software cannot rely solely on the IPs and upgrade infrastructure framework of FIG. 3 alone without the additional set of IPs for proper cluster upgrade preparation and rollback support because such cluster prepare and rollback behavior of IPs 2A and 2B can be too specific and centered around the primary appliance. Generally, the foregoing can hold true for the NAS cluster software or any additional cluster software installed and upgraded on the cluster in addition to the first or base system cluster software. In at least one embodiment, another example of second cluster software that can be installed on top of the base cluster and can utilize the IPs of FIG. 3 along with the additional set of IPs discussed in more detail below can include cloud tiering or tethering cluster software that provides functionality including replication and/or backup of data to the cloud. In this manner in at least one embodiment, the one or more additional second cluster software instances installed on top of the first base cluster software can utilize the additional set of IPs discussed below to manage their respective cluster prepare and rollback behavior.

Generally, as used herein depending on context, the term cluster can sometimes refer to a hardware cluster of appliances 335-338, or a software cluster of components that can be installed and execute on various ones of the appliances 335-338. In at least one embodiment, cluster software such as the base cluster software, NAS cluster software and cloud tiering cluster software noted above, can have an associated software architecture and structure with a cluster controller or manager and other software components. In at least one embodiment, the cluster controller or manager of a software cluster can reside on a first of the appliances and one or more other software components of the software cluster can reside on the remaining appliances and also possibly the first appliance depending on the particular software cluster architecture. In at least one embodiment, the NAS cluster software can be SDNAS (software defined) NAS cluster software including software servers or file servers that provide access to client file systems where the file servers can provide various file system services and service file system and file commands. In at least one embodiment using SDNAS, the SDNAS file servers can be virtualized and can execute in the context of virtual machines (VMs) on one or more of the appliances 335-338. One or more instances of SDNAS file servers or services can be installed and execute on one or more of the appliances 335-338, where the file servers can consume physical storage from backend non-volatile storage devices exposed as data stores or file systems through the SDNAS file servers to storage clients such as, for example, external hosts. In at least one embodiment, the file servers, such as NAS or SDNAS file servers, can provide file system services for file systems mounted on block-based devices. Thus in at least one embodiment, the NAS or SDNAS file servers can be run on top of block-based services provided by the base cluster software.

Figure 6:
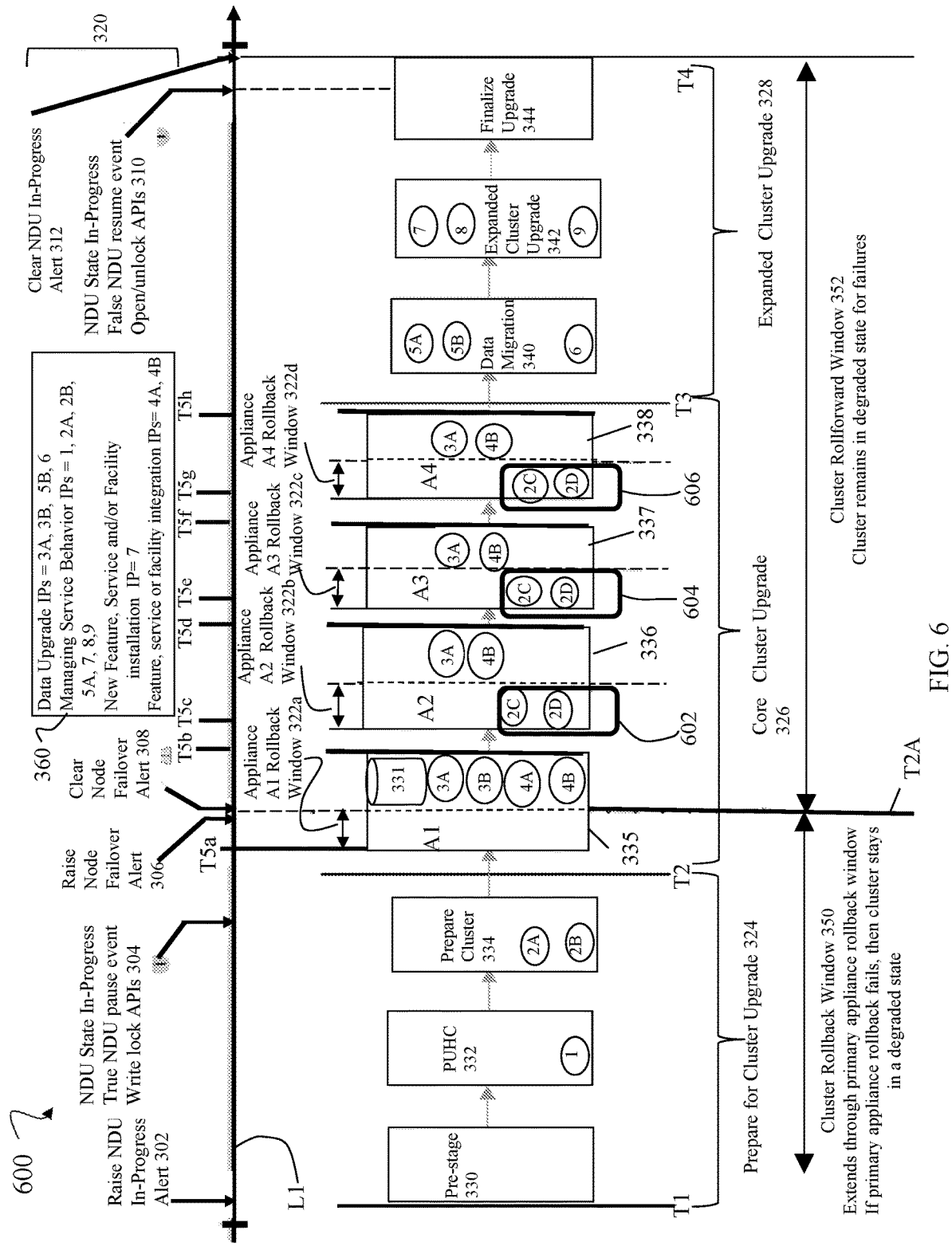

Referring to FIG. 6, shown is an example 600 illustrating components and integration points (IPs) in at least one embodiment in accordance with the techniques of the present disclosure.

In at least one embodiment, the components and IPs of FIG. 6 can include those as discussed and illustrated in connection with FIG. 3 herein along with the additional IPs, IP 2C and IP 2D, as noted in FIG. 6 and as further discussed in more detail below.

In at least one embodiment in accordance with FIG. 6, the upgrade infrastructure can include code that prepares for the cluster upgrade phase 324, performs processing for the core cluster upgrade phase 326, and performs processing of the expanded cluster upgrade phase 328 such as discussed in connection with FIG. 3 with differences or additions discussed below. Code of the upgrade infrastructure can drive or control the upgrade workflow phases 324, 326 and 328 and additionally perform calls to user provided code at the various integration points to perform customized upgrade work or processing in connection with upgrading different features, facilities or services. As illustrated in FIG. 6 in at least one embodiment, the phases 324, 326 and 328 can be performed sequentially in order. In at least one embodiment, the phase 324 can include performing processing denoted by the elements 330, 332 and 334 sequentially. In the phase 324 in at least one embodiment, the processing associated with integration points 1, 2A and 2B can be performed in sequential order. In the phase 326 in at least one embodiment, each of the appliances 335-338 can be upgraded sequentially characterizing a rolling upgrade of the appliances 335-338. When the primary or first appliance 335 is upgraded, the processing associated with the IPs 3A, 3B 4A and 4B can be performed in sequential order. For each of the secondary appliances 336-338 to be upgraded, the processing associated with the IPs 2C, 3A and 4B can be performed in sequential order. In at least one embodiment, processing associated with IP 2C can be performed prior to upgrading each secondary appliance. Thus the workflow for a secondary appliance, such as A2 336, can include performing processing associated with IP 2C and then upgrading A2 where IPs 3A and 4B can be performed as part of upgrading the second node of A2.

The IP 2D of each secondary appliance 336-338 can denote a hook or IP where processing can be performed in connection with secondary appliance level rollback. For example, in at least one embodiment, processing associated with IP 2D of appliance A2 336 can be performed in response to a successful rollback of cluster software on A2 from V2 to V1 with respect to software of the multiple clusters including the base system and NAS clusters. The processing of IP 2D can include rollback work or tasks in connection with the NAS cluster. In at least one embodiment after a successful appliance level rollback of A2, IP 2D processing can be performed and can include locating the particular appliance on which the NAS cluster manager executes, and notifying the NAS cluster manager regarding the successful rollback of A2. In response to the notification, the NAS cluster manager may place the NAS cluster in a corresponding NAS cluster rollback mode or state. After the successful rollback of A2, the cluster upgrade workflow can stop. At a subsequent point in time, the upgrade workflow processing can resume such as in connection with again attempting to upgrade A2. In at least one embodiment, the foregoing NAS cluster rollback mode or state can be persisted and included in state information that can be further used/read in connection with restarting the upgrade workflow processing. As may be needed, the rollback work or tasks performed in connection with IP 2D can vary with the particular software cluster. For example, if the NAS cluster requires all appliances 335-338 to be running the same version of NAS cluster software (e.g., all V1 or all V2) in at least one embodiment, IP 2D processing performed for each of the secondary appliances 336-338 can include rolling back NAS cluster software on all appliances if there is an appliance level rollback on any one of the secondary appliances 336-338.

Consistent with other discussion herein in at least one embodiment, the cluster upgrade workflow can include sequentially and consecutively upgrading the appliances in the following order: A1 335, A2 336, A3 337 and then A4 338.

As illustrated in FIG. 6 in at least one embodiment, the phase 328 can include performing processing denoted by the elements 340, 342 and 344 sequentially in order. In the phase 328 in at least one embodiment, the processing associated with IPs 5A, 5B, 6, 7, 8 and 9 can be performed in sequential order.

In connection with examples and discussion herein, reference can be made to an embodiment including multiple installed software clusters, such as the base system software cluster and NAS software cluster being upgraded. In at least one embodiment for simplicity in illustration, assume that multiple installed software clusters are being upgraded from V1 to V2 although the particular installed and upgrade versions of the multiple independent software clusters can vary. Additionally, in at least one embodiment including the base system software cluster and one or more additional installed software clusters such as the NAS software cluster, when upgrading software of multiple software clusters on an individual appliance such as the secondary appliance A2 336, if there is an upgrade failure on A2 with respect to any one of the software clusters, processing can include determining a same synchronized state of upgrade failure for all software clusters. For example, an upgrade failure on A2 of the base system and/or the NAS software cluster can result in a synchronized upgrade failure state of A2 with respect to both the base system software cluster and NAS software cluster. In at least one embodiment, if the upgrade failure of A2 occurs within A2's appliance rollback window 322*b*, processing can be performed by the upgrade infrastructure to rollback A2 including rolling back both the base system and NAS cluster software from V2 to V1. Further, if the foregoing A2 rollback is successful in at least one embodiment, the IP 2D can be invoked where additional rollback work or tasks can be performed in connection with the NAS cluster software. Consistent with other discussion herein in at least one embodiment, processing performed in connection with IP 2D in response to a successful A2 rollback for the NAS cluster can include the primary appliance A1 335 issuing commands or queries to the secondary appliances 336-338 to locate the single secondary appliance upon which the NAS cluster manager resides (e.g., is installed and currently executing as the active NAS cluster manager), and then sending one or more commands or messages to the NAS cluster manager of the located secondary appliance to communicate current NAS cluster state information. As a result, the NAS cluster manager can, as may be needed, perform additional processing in response to the particular NAS cluster state information. For example, assume that the NAS cluster manager is located on appliance A2 336 and the primary appliance 335 (e.g., executing code that drives or control the upgrade workflow processing) sends a message to the NAS cluster manager on A2 indicating that the NAS cluster state information includes A2 in rollback mode. In response, the NAS cluster manager may perform or trigger additional processing based, at least in part, on the A2 rollback mode or state. In at least one embodiment, the NAS cluster manager additional processing can include further setting a NAS cluster-level state or mode to rollback as a result of the appliance level A2 rollback state or mode. The additional processing performed by the NAS cluster manager can also include other processing as may be needed in an embodiment. In at least one embodiment, such other processing can include starting and/or stopping particular NAS-related services or software on A2.

It should be noted that, for simplicity of illustration as discussed above and in connection with other examples herein, an upgrade failure on A2 of the base system and/or the NAS software cluster can result in a collective synchronized upgrade failure state of A2 with respect to both the base system and NAS software cluster. As a variation in at least one embodiment, there can be individual upgrade failure states independently maintained for each, or one or more, of the multiple software clusters. For example, a synchronized or dependent upgrade state can be collectively determined for two or more software clusters that may be dependent on one another. As another example, an individual upgrade state can be determined and maintained for each of the multiple software clusters such that an upgrade failure on A2, for example, of the base system may not result in an automatic state of upgrade failure of A2 for the NAS cluster software.

In at least one embodiment, prior to performing a secondary appliance upgrade, such as prior to performing an upgrade of the base system and NAS software clusters on A2 336, the IP 2C can be invoked which results in executing code that performs any needed preparation task or work prior to the A2 upgrade. In at least one embodiment, processing performed at IP 2C can be based, at least in part, on the NAS cluster software upgrade of A2.

In FIG. 6, the element 602 denotes the additional set of IPs, IP 2C and IP 2D, that can be invoked in connection with upgrading the secondary appliance A2 335. In at least one embodiment, code associated with IP 2C can be invoked prior to upgrading software of the base system and NAS clusters on A2 335 from V1 to V2. Subsequently after executing code associated with IP 2C, software of the base system and NAS clusters on A2 335 can be upgraded. If an upgrade failure of the base system and/or NAS cluster occurs during the corresponding A2 rollback window 322*b*, rollback processing can be performed to rollback both software of both the base system and NAS clusters from V2 to V1. Additionally in at least one embodiment, if such rollback of A2 is successful, code associated with IP 2D can be executed to perform additional rollback work or tasks such as in connection with the NAS cluster rollback of A2.

Further details regarding IP 2C and 2D, including examples of associated processing and uses in at least one embodiment, are discussed in the following paragraphs.

In at least one embodiment, the upgrade infrastructure code can implement a state machine that drives and controls processing of the upgrade workflow and associated integration points. In at least one embodiment, the upgrade states of the state machine can include states corresponding to the processing and integration points (IPs) as described herein such in connection with FIGS. 3 and 6. Thus in at least one embodiment, the infrastructure code can include the executable code that implements the state machine controlling the upgrade workflow to upgrade a system such as a data storage system. In at least one embodiment, the state machine that drives or controls the upgrade workflow processing can be included in code executing on the primary appliance 335. In at least one embodiment, the code controlling the state machine can be included in the base system cluster manager executing on the primary appliance 335.

Figure 7:
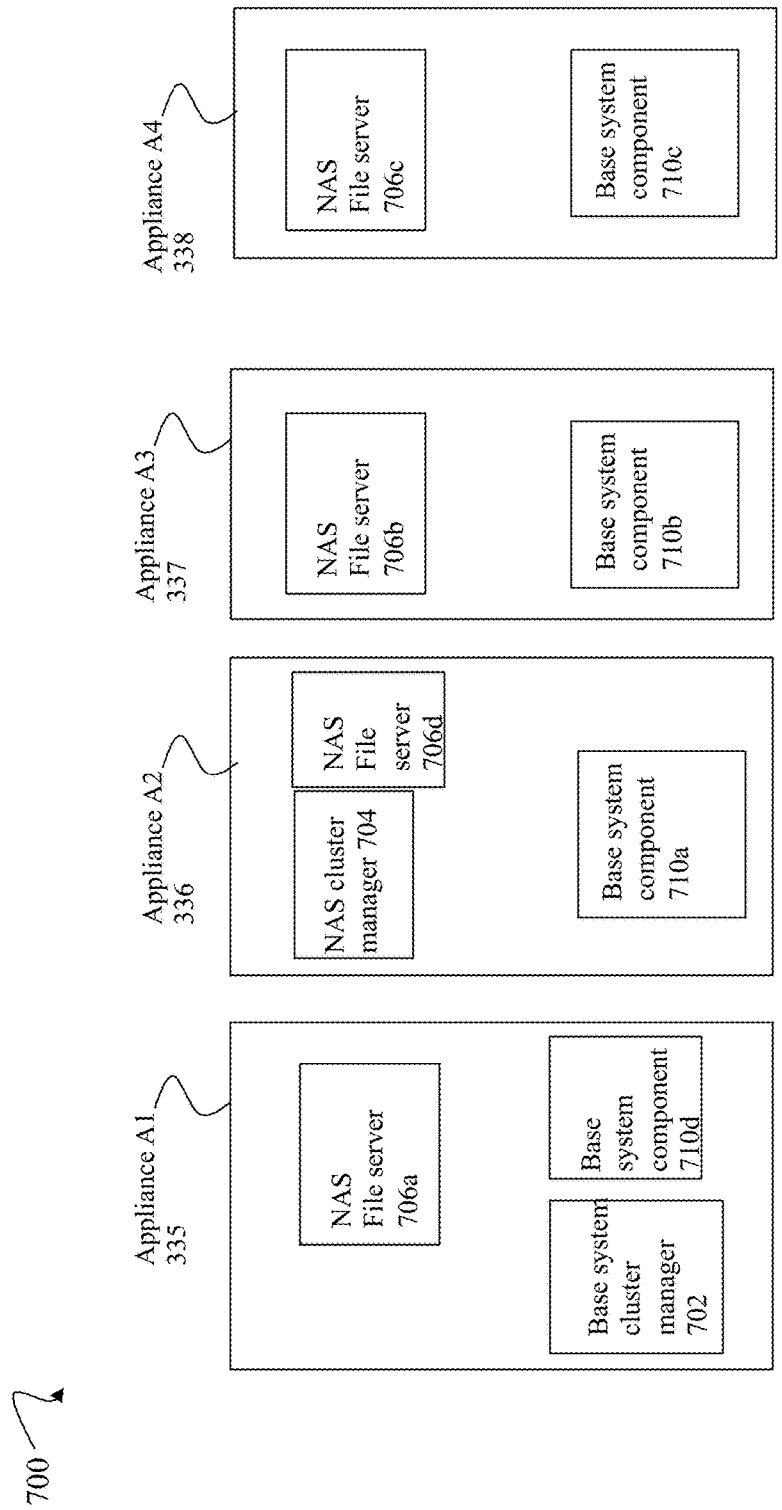
FIGS. 7, 8 and 9 are examples of components of multiple software clusters on appliances in at least one embodiment in accordance with the techniques of the present disclosure.

Referring to FIG. 7, shown is an example 700 illustrating a current installation of a base system software cluster and a NAS software cluster in at least one embodiment in accordance with the techniques of the present disclosure. The example 700 includes the appliances 335-338 as in connection with FIG. 6, where appliance A1 335 denotes the primary appliance and the remaining appliances 336, 337 and 338 are secondary appliances. Consistent with other discussion herein, the appliances can be upgraded using the upgrade infrastructure framework described herein in consecutive sequential order as follows: A1 335, A2 336, A3 337 and A4 338. In at least one embodiment consistent with other discussion herein, the primary appliance A1 335 can execute code implementing the state machine corresponding to the upgrade workflow processing that drives and controls the upgrade process.

In at least one embodiment, the base system software cluster can include the base system cluster manager 702 and base system components 710*a-d*. In at least one embodiment, the NAS software cluster can include NAS cluster manager 704 and NAS file servers 706*a-d*. It should be noted that the base system software cluster and the NAS software cluster can include other components than the few included in the example 700 for simplicity of illustration.

The NAS file server 706*a*, base system cluster manager 702 and the base system component 710*d* can be installed and execute on the primary appliance A1 335. The NAS cluster manager 704, NAS file server 706*d*, and base system component 710*a* can be installed and execute on the appliance A2 336. The NAS file server 706*b* and base system component 710*b* can be installed and execute on the appliance A3 337. The NAS file server 706*c* and base system component 710*c* can be installed and execute on the appliance A4 338.

In at least one embodiment as discussed above, the base system cluster software can have the base system cluster manager 702 on the primary appliance A1 335, where the base system cluster manager 702 executes on whichever appliance is currently the primary appliance such that the base system cluster manager 702 is not installed or executed on any secondary appliance 336-338. In at least one embodiment, the NAS software cluster can include the NAS cluster manager 704 which can be located and execute on a different appliance other than 335. Put another way, the NAS cluster manager 704 can be located and execute on a different appliance than the base system cluster manager 702. In the example 700, the NAS cluster manager 704 is shown on the appliance A2 336 for purposes of illustration. More generally, the NAS cluster manager 704 can be installed and execute on any one of the appliances 335-338. Additionally in at least one embodiment, the particular appliance 335-338 on which the NAS cluster manager 704 executes can change during the lifetime or life cycle of cluster such that the base cluster manager 702 and the NAS cluster manager 704 are located on different appliances of the cluster.

In at least one embodiment where each of the appliances 335-338 is a dual node appliance, each node of the appliance can execute one or more instances of the base system components and NAS file servers although each appliance is illustrated for simplicity as only including the few components of FIG. 7.

Figure 8:
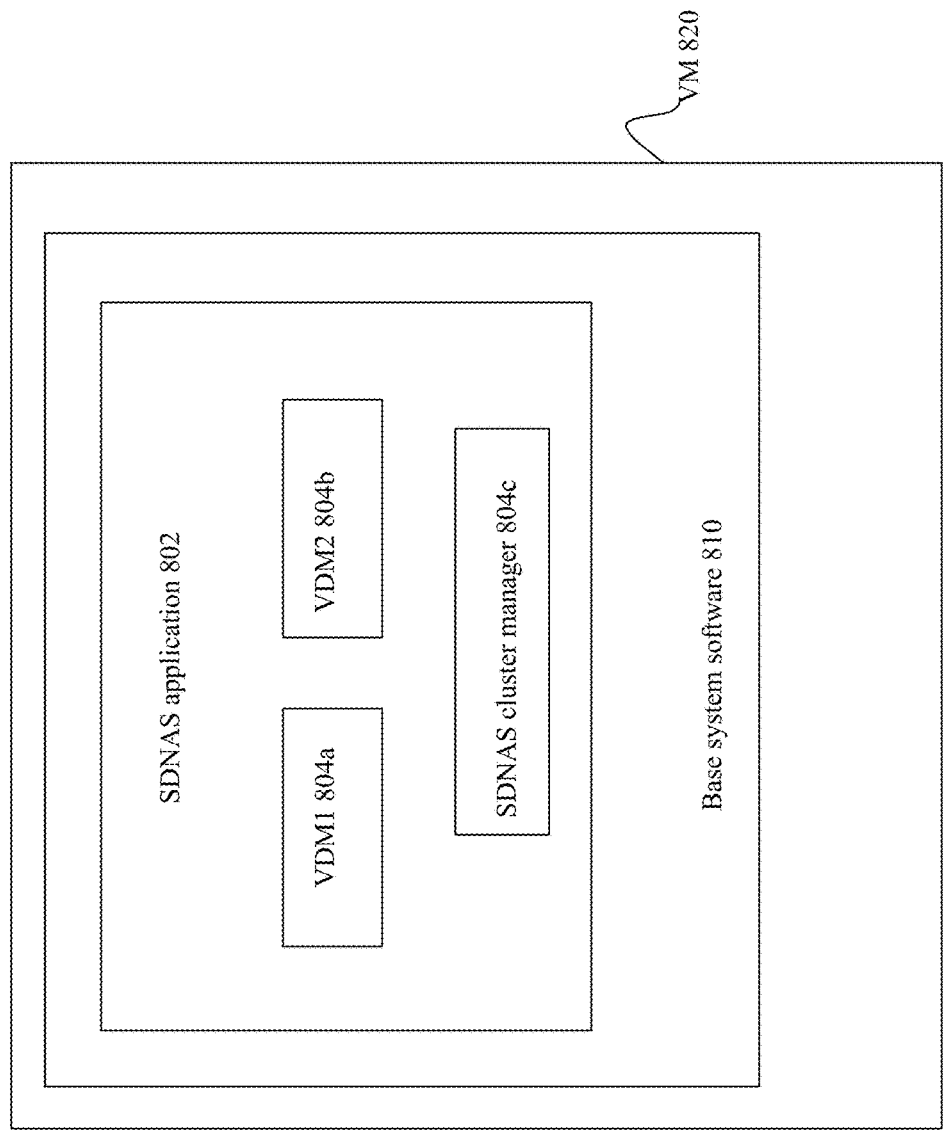

Referring to FIG. 8, shown is an example 800 illustrating an SDNAS application 802 in at least one embodiment in accordance with the techniques of the present disclosure. The SDNAS application 802 can denote components of the NAS or SDNAS software cluster executing on a single appliance, and the base system software 810 can denote components of the base system software cluster executing on the same single appliance. In at least one embodiment, the base system software cluster can include, for example, the base system cluster manager, a base operating system and other services such as block storage services of the base system component. In at least one embodiment, the SDNAS application 810 and base system software 810 can be virtualized and can execute in the context of a VM 820 on the single appliance. In this example, the SDNAS application 802 includes VDMs or virtual data movers 804a-b and SDNAS cluster manager 804c. More generally, the SDNAS application 802 executing on a single appliance of the cluster can include just the SDNAS cluster manager 804c, just one or more VDMs, both the SDNAS cluster manager and one or more VDMs, or suitable combinations of components that can vary with embodiment.

In at least one embodiment, each of the VDMs 804a-b can denote a generic file server that can expose file systems of one or more types in accordance with one or more file system-based protocols. For example, in at least one embodiment, each of the VDMs 804a-b can expose file systems and service file-based commands in accordance with one or more of the following protocols: CIFS (Common Internet File System), NFS (Network File System), and/or pNFS (Parallel Network File System). Thus in at least one embodiment, each of the VDMs 804a-b can be a software feature that enables the grouping of CIFS, NFS and/or pNFS servers into virtual containers. In at least one embodiment, each VDM 804a-b can be a component that acts as a gateway to present NAS storage to a client or end-user where each VDM can use one or more file-based protocols. Thus in such an embodiment, each VDM can correspond to a NAS file server instance and can include one or more file servers each corresponding to one of the different supported file-based protocols serviced by the VDM. Put another way in at least one embodiment, each VDM can be characterized as a generic file server capable of servicing one or more supported file-based protocols. In at least one embodiment, a single VDM can service only a single file-based protocol. For example, VDM 804a can expose file systems and service file-based commands in accordance with a single protocol such as the CIFS protocol; and VDM 804b can expose file systems and service file-based commands in accordance with a different single protocol such as the NFS protocol. In this manner, use of VDMs provides the capability as may be desired in a particular embodiment to separate or isolate CIFS environments from NFS environments for any suitable reason. For example, in at least one embodiment, such file-based protocol separation or isolation, where a single VDM only supports a single file-based protocol, can be implemented to make replication, migration, and performing other services easier.

In at least one embodiment where each of the appliances 335-338 is a dual node appliance, each node of the appliance can execute one or more instances of an SDNAS application including one or more VDMs or file servers.

Figure 9:
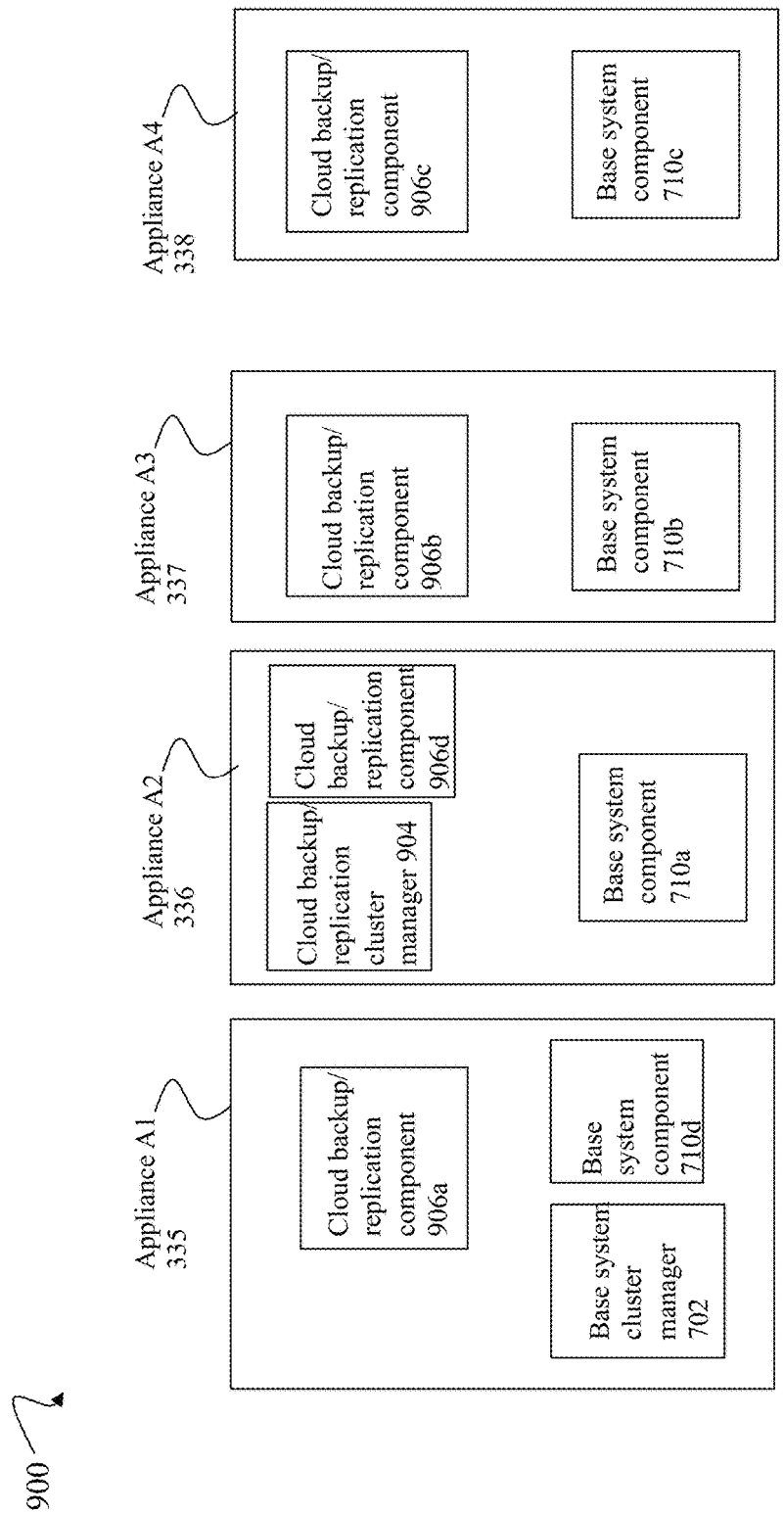

Referring to FIG. 9, shown is an example 900 illustrating a current installation of a base system software cluster and a cloud backup or replication software cluster in at least one embodiment in accordance with the techniques of the present disclosure. The example 900 includes the appliances 335-338 as in connection with FIG. 6, where appliance A1 335 denotes the primary appliance and the remaining appliances 336, 337 and 338 are secondary appliances. Consistent with other discussion herein, the appliances can be upgraded using the upgrade infrastructure framework described herein in consecutive sequential order as follows: A1 335, A2 336, A3 337 and A4 338. In at least one embodiment consistent with other discussion herein, the primary appliance A1 335 can execute code implementing the state machine corresponding to the upgrade workflow processing that drives and controls the upgrade process.

In at least one embodiment, the base system software cluster can include the base system cluster manager 702 and base system components 710a-d as described in connection with FIG. 7. In at least one embodiment, the cloud backup or replication software cluster can include cloud backup or replication cluster manager 904 and cloud backup or replication components 906a-d that perform backup or replication of data from their respective appliances to the cloud. It should be noted that the base system software cluster and the cloud backup or replication software cluster can include other components than the few included in the example 900 for simplicity of illustration.

The cloud backup or replication component 906a, base system cluster manager 702 and base system component 710d can be installed and execute on the primary appliance A1 335. The cloud backup or replication cluster manager 904, cloud backup or replication component 906d, and base system component 710a can be installed and execute on the appliance A2 336. The cloud backup or replication component 906b and base system component 710b can be installed and execute on the appliance A3 337. The cloud backup or replication component 906c and base system component 710c can be installed and execute on the appliance A4 338.

In at least one embodiment as discussed above, the base system cluster software can have the base system cluster manager 702 on the primary A1 appliance 335 where the base system cluster manager 702 remains on the primary appliance A1 335 and is not installed or executed on any of the secondary appliances 336-338. In contrast in at least one embodiment, the cloud backup or replication software cluster can include the cloud backup or replication cluster manager 904 which can be installed and execute on any of the appliances 335-338. In the example 900, the cloud backup or replication cluster manager 904 is shown on the appliance A2 336 for purposes of illustration. More generally, the cloud backup or replication cluster manager 904 can be installed and execute on any one of the appliances 335-338. Additionally in at least one embodiment, the particular appliance 335-338 on which the cloud backup or replication cluster manager 904 executes can change during the lifetime or life cycle of cluster such that the base cluster manager 702 and the cloud backup or replication cluster manager 904 are located on different appliances of the cluster.

Accordingly in at least one embodiment, at the time of an upgrade of the cluster, the cloud backup or replication cluster manager 904 can be located on any one of the appliances 335-338; and in contrast, the base system cluster manager 702 can always be installed and execute on the primary appliance A1 335.

In at least one embodiment as discussed above, the base system cluster software can have the base system cluster manager 702 on the primary appliance A1 335, where the base system cluster manager 702 executes on whichever appliance is currently the primary appliance such that the base system cluster manager 702 is not installed or executed on any secondary appliance. In at least one embodiment, the cloud backup or replication software cluster can include the cloud backup or replication cluster manager 904 which can be located and execute on a different appliance other than 335. Put another way, the cloud backup or replication cluster manager 904 can be located and execute on a different appliance than the base system cluster manager 702. In the example 900, the cloud backup or replication cluster manager 904 is shown on the appliance A2 336 for purposes of illustration. More generally, the cloud backup or replication cluster manager 904 can be installed and execute on any one of the appliances 335-338. Additionally in at least one embodiment, the particular appliance 335-338 on which the cloud backup or replication cluster manager 904 executes can change during the lifetime or life cycle of cluster such that the base cluster manager 702 and the cloud backup or replication cluster manager 904 are located on different appliances of the cluster.

In at least one embodiment where each of the appliances 335-338 is a dual node appliance, each node of the appliance can execute one or more instances of the base system components and cloud backup or replication components although each appliance is illustrated for simplicity as only including the few components of FIG. 9.

Thus, the NAS cluster software (such as discussed in connection with FIGS. 7 and 8) and the cloud backup or replication cluster software (such as discussed in connection with FIG. 9) are examples of second or additional software clusters that can be installed on top of the base system cluster software. In at least one embodiment, such second or additional software clusters can utilize the additional set of IPs, IP 2C and IP 2D, discussed in more detail elsewhere herein, alone or in addition to IP 2A and IP2 B, to manager their respective cluster behaviors such as cluster prepare and rollback behavior. For example, in at least one embodiment, the NAS cluster manager may be called to perform processing in connection with a failure or rollback with respect to the NAS cluster upgrade at different times than the base system cluster manager. The set of additional IPs 2C and 2D discussed in more elsewhere herein correspond to additional upgrade workflow processing points of the upgrade infrastructure at which user or developer provided code modules or routines can be invoked to facilitate the additional communications with the NAS cluster manager.

Generally in at least one embodiment, a cluster manager can perform any suitable processing on behalf of the corresponding cluster such as related to management and coordination of the various components of the corresponding cluster. For example in at least one embodiment, the base system cluster manager can decide on which appliance to store a particular block device, such as a LUN, that is created. The base system cluster manager can have cluster-wide information regarding all the appliances A1-A4 and can use such information to select one of the appliances upon which to store the LUN. For example, the base system cluster manager can select an appliance based on the amount of available non-volatile physical storage capacity on each of the appliances where the LUN has its storage provisioned from non-volatile storage devices locally accessible to only the corresponding appliance. As another example, the base system cluster manager can make decisions about which appliance, and perhaps which node of the appliance, should perform a particular operation, task or service based, at least in part, on corresponding workloads and resource utilization levels of each of the appliances. In this manner in at least one embodiment, the base system cluster manager, as well as other cluster managers such as the NAS cluster manager and the cloud backup or replication cluster manager, can perform cluster management operations such as related to load balancing among the appliances. As another example in at least one embodiment, the NAS cluster manager can select an appliance for storing a file, file system, and the like, based at least in part on the amount of available non-volatile physical storage capacity on each of the appliances where the file or file system has its storage provisioned from non-volatile storage devices locally accessible to only the corresponding appliance.

In at least one embodiment, each of the installed software clusters, such as the base system cluster, NAS software cluster, and cloud backup and replication software cluster, can provide for all appliances of the cluster to collectively work together to provide services. For example, in at least one embodiment, the individual appliances of the cluster may not be individually exposed to an external storage client such as a host. Rather, the storage client can be presented with a single virtualized cluster view to which the client can issue various commands, requests, and the like. For example, the host can issue one or more commands to create a LUN by issuing such commands generally to the cluster independent of the particular appliance upon which the LUN has its storage provisioned. The various software components, for example, of the base system cluster software can perform processing to service the I/Os and access the LUN's content as stored on the particular appliance in a manner that is transparent to the client. In a similar manner in at least one embodiment, the host can issue file-based commands or requests to the cluster for files and file systems that can be stored on any one of the appliances by the NAS cluster software.

In at least one embodiment where there are multiple software clusters installed across the appliances, there can be a need to communicate with the various cluster managers to synchronize the state of all such software clusters based on the particular state of the upgrade in order to present a single upgrade state to the user performing an upgrade. For example in at least one embodiment assume that a cluster upgrade is performed to upgrade two software clusters on the appliances 335-338 from V1 to V2, where the base system cluster software V1 is being upgraded to V2 thereof, and where the NAS cluster software V1 is being upgraded to V2 thereof. An error or upgrade failure can occur during the secondary appliance A2 rollback window 322b such that an appliance level rollback from V2 to V1 can be performed for A2 with respect to both the base system and NAS software clusters. In at least one embodiment, processing can be performed to rollback the base system on A2 from V1 to V2, and additionally, rollback the NAS cluster software of A2 from V2 to V1.

In at least one embodiment, such coordination of rollbacks as well as other processing of a particular software cluster can occur through the software cluster's corresponding cluster manager. In this example, the base system cluster manager on A1 needs to communicate with the NAS cluster manager in connection with the NAS cluster rollback processing of A2. In this example, it can be necessary for the base system cluster manager to first determine on which appliance the NAS cluster manager is executing, and then subsequently issue commands or requests to the NAS cluster manager to commence rollback processing of the NAS cluster upgrade on A2. In at least one embodiment as discussed in more detail in the following paragraphs, the additional set of IPs, including IP 2D, can be used to perform the foregoing in order to synchronize the state of the appliances and thus the state of the cluster upgrade.

In at least one embodiment, the NAS cluster manager, as well as generally any cluster manager, may need to be informed regarding any appliance level rollback as well as when there is a cluster level rollback. Referring to FIG. 6 in at least one embodiment, each appliance 335-338 has a corresponding appliance rollback window 322a-d such that if an upgrade failure occurs on any appliance during its corresponding appliance rollback window, that appliance can be rolled back such as from V2 to V1 with respect to all software clusters (e.g., base system software cluster and the NAS software cluster are both rolled back from V2 to V1). In at least one embodiment, a cluster level rollback can occur during the cluster rollback window 350 where the primary appliance rollback window 322a is included in the cluster rollback window 350. In such an embodiment, a failure on the primary appliance A1 during 322a can result in an appliance level rollback of A1 and also a cluster level rollback with respect to both the base system cluster software and the NAS cluster software. In at least one embodiment, one or more of the cluster managers, such as the NAS cluster manager, may need to know about both the foregoing appliance level rollback of A1 and also the cluster level rollback. In at least one embodiment, the infrastructure code including the upgrade state machine that drives or controls the upgrade workflow processing can execute on the primary appliance A1 335 and can communicate with the various cluster managers during the upgrade. Such communication can be needed, for example, to issue commands to the various cluster managers, receive information or replies from the various cluster managers, communicate upgrade state information to the various cluster managers, and the like.

In at least one embodiment, the base system cluster manager can facilitate orchestrating communication with one or more other cluster managers, such as the NAS cluster manager, during the upgrade. Since the NAS cluster manager can be located on any appliance, in at least one embodiment as part of processing performed in connection with IP 2C prior to upgrading appliance A2, the base system cluster manager executing on appliance A1 can issue commands or queries to the remaining secondary appliances A2-A4 inquiring whether the NAS cluster manager is executed on the particular secondary appliance. The particular secondary appliance, such as A3, which includes the NAS cluster manager can reply to the base system cluster manager and indicate that the NAS cluster manager is located on appliance A3. As part of processing performed in connection with IP 2C in at least one embodiment, the base system cluster manager can then issue a second command to the NAS cluster manager of A3 to inform the NAS cluster manager that upgrading of NAS cluster software of A2 is about to commence where the NAS cluster manager can then place the NAS cluster in a corresponding mode or state of "A2 upgrade mode". Subsequently, the base system cluster manager can trigger upgrading of A2. In at least one embodiment, the base system cluster manager can then issue one or more additional commands to A2 to commence upgrading which can include upgrading the NAS cluster software on A2. Such upgrading of A2 triggered by the one or more additional commands can also include upgrading the base system cluster software of A2.

As another example, since the NAS cluster manager can be located on any appliance, in at least one embodiment as part of processing performed in connection with IP 2D prior to rolling back the multiple software clusters of appliance A2, the base system cluster manager executing on appliance A1 can issue commands or queries to the remaining secondary appliances A2-A4 inquiring whether the NAS cluster manager is executed on the particular secondary appliance. The particular secondary appliance, such as A3, which includes the NAS cluster manager can reply to the base system cluster manager and indicate that the NAS cluster manager is located on appliance A3. As part of processing performed in connection with IP 2D in at least one embodiment, the base system cluster manager can then issue a second command to the NAS cluster manager of A3 to inform the NAS cluster manager regarding successful rollback of NAS cluster software of A2, where the NAS cluster manager can then place the NAS cluster in a corresponding mode or state of "A2 rollback mode". In at least one embodiment of NAS cluster software, an appliance level rollback of NAS cluster software can further trigger a cluster level rollback mode or state that is set by the NAS cluster manager in response to the successful A2 rollback of NAS cluster software. Thus in connection with IP 2D, the NAS cluster manager can perform any necessary processing in connection with rolling back a secondary appliance of the NAS cluster and/or placing the NAS cluster in a cluster rollback state or mode.

What will now be described are further details regarding the IP 2C and IP 2D in at least one embodiment in accordance with the techniques of the present disclosure.

In the following paragraphs, reference can be made to callbacks associated with an IP where the callbacks are invoked when the upgrade workflow processing reaches, during runtime execution, the corresponding IP. In at least one embodiment as discussed elsewhere herein, the callbacks can be user provided or developer provided routines or code entities. Accordingly, although callbacks can be mentioned in the following paragraphs when discussing IPs such as IP 2C and IP 2D, the callbacks more generally correspond to code entities of executable code that can be implemented as callbacks or other suitable mechanisms in accordance with techniques of the present disclosure to establish the needed runtime linkages such as illustrated in FIG. 5.

In at least one embodiment, the IP 2C, and callbacks associated with IP 2C, can be invoked from the cluster upgrade state machine implementing the upgrade workflow before starting a secondary appliance 336-338 upgrade. In at least one embodiment, the IP 2D, and callbacks associated with IP 2D, can be invoked from the cluster upgrade state machine implementing the upgrade workflow when rollback succeeds on a secondary appliance 336-338.

In at least one embodiment, the callbacks of IP 2C and IP 2D can be executed on the primary appliance A1 335 as part of the cluster upgrade workflow. In turn, for IP 2C and IP 2D, callbacks executed on A1 can issue commands to the various appliances, such as secondary appliances 336-338, to perform any needed tasks or processing. For example, callback C1 of IP 2C can be invoked and executed on A1 prior to upgrading secondary appliance A2 336. In turn, code of the callback C1 executing on A1 can issue one or more commands, messages, requests, and the like, to A2 to perform preparation tasks or operations needed prior to upgrading A2. As a variation to the foregoing in at least one embodiment, code of the callbacks of IP 2C and/or IP 2D can alternatively be executed directly on the individual secondary appliances 336-338.

In some scenarios, the callbacks of IP 2C and IP 2D can be invoked when the cluster appliances are running mixed versions of software so the infrastructure framework and any commands or callbacks added to IP 2C and IP 2D can handle execution with the mix software versions in the cluster.

In connection with IP 2C in at least one embodiment, commands or callbacks to prepare the NAS cluster software for upgrade can be placed at IP 2C. In at least one embodiment, callbacks or commands of IP 2C can perform preparation work needed such as for the NAS or other cluster prior to upgrading a secondary appliance 336-338.

In at least one embodiment, IP 2C, and callbacks or commands associated with IP 2C, can be:
1) invoked once for each secondary appliance in the cluster; and
2) invoked when the cluster upgrade workflow processing starts initially and also on restart after a failure on a secondary appliance upgrade when its corresponding state, after appliance level rollback is rollback succeeds.

On initially starting the upgrade workflow processing, the callbacks of IP 2A can be invoked and execute on the primary appliance, and then the callbacks of IP 2C can be invoked for every secondary appliance prior to upgrading the secondary appliance.

In at least one embodiment, processing for preparing the secondary appliances for upgrade can be added at IP 2C. For example, NAS cluster software or other cluster software layered on top of the base system cluster the cluster secondary appliances can add preparation commands or processing in callbacks associated with IP 2C.

In at least one embodiment, callbacks of IP 2C can be called on restart after a failure of an appliance upgrade having an associated state of rollback success. In such an embodiment, a secondary appliance upgrade failure can occur in the secondary appliance's rollback window. In this case, the failed secondary appliance can be rolled back to the prior version/pre upgrade version with respect to software of one or more s clusters installed on the secondary appliance. The foregoing appliance level rollback can be successfully performed or alternatively rollback failure can occur during the rollback processing. In at least one embodiment, the above-noted restart of the upgrade workflow processing can resume and execute callbacks of IP 2C only if the appliance level rollback was successful, and not, for example, if the appliance level rollback failed or was unsuccessful. In connection with IP 2C in at least one embodiment, a state or mode of rollback succeeds can refer to the state of the appliance when the upgrade workflow processing is restarted. In at least one embodiment, the state regarding success or failure with respect to an appliance level rollback of a secondary appliance can be persistently stored and then subsequently read and used in connection with restarting the upgrade workflow processing of the infrastructure to determine whether restarting includes calling or invoking IP 2C for the secondary appliance. If the rollback of the secondary appliance failed, the upgrade workflow can restart with upgrading the secondary appliance without first calling or invoking IP 2C prior to the upgrading of the secondary appliance.

In at least one embodiment, the base system software cluster can use the IP 2A and may not have a need to use IP 2C or IP 2D.

In at least one embodiment, IP 2D, and callbacks or commands associated with IP 2C, can be called from the cluster upgrade workflow when appliance rollback succeeds on any/each secondary appliance in the cluster. Upgrade failures that occur in the cluster rollback window 350 (e.g., when appliance rollback succeeds on the primary appliance) can invoke IP 2A.

In at least one embodiment, software clusters other than the base system cluster can add any rollback work or processing for secondary appliances to callbacks invoked in connection with IP 2D.

In at least one embodiment, rollback success associated with IP 2D can refer to the rollback state returned from the appliance during an appliance upgrade.

In at least one embodiment, the same IP 2C and associated callbacks can be called prior to upgrading each of the secondary appliances A2-A4. The foregoing can be in contrast to an alternative embodiment that can, for example, have a different customized instance of IP 2C with possibly different callbacks for each of the secondary appliances A2-A4. For example, in the latter alternative embodiment, there can be 3 defined instances of IP 2C each with its own set of associated callbacks, and where each of the 3 defined instances of IP 2C can be uniquely associated and invoked prior to upgrading a different corresponding one of the 3 secondary appliances A2-A4.

Figure 10:
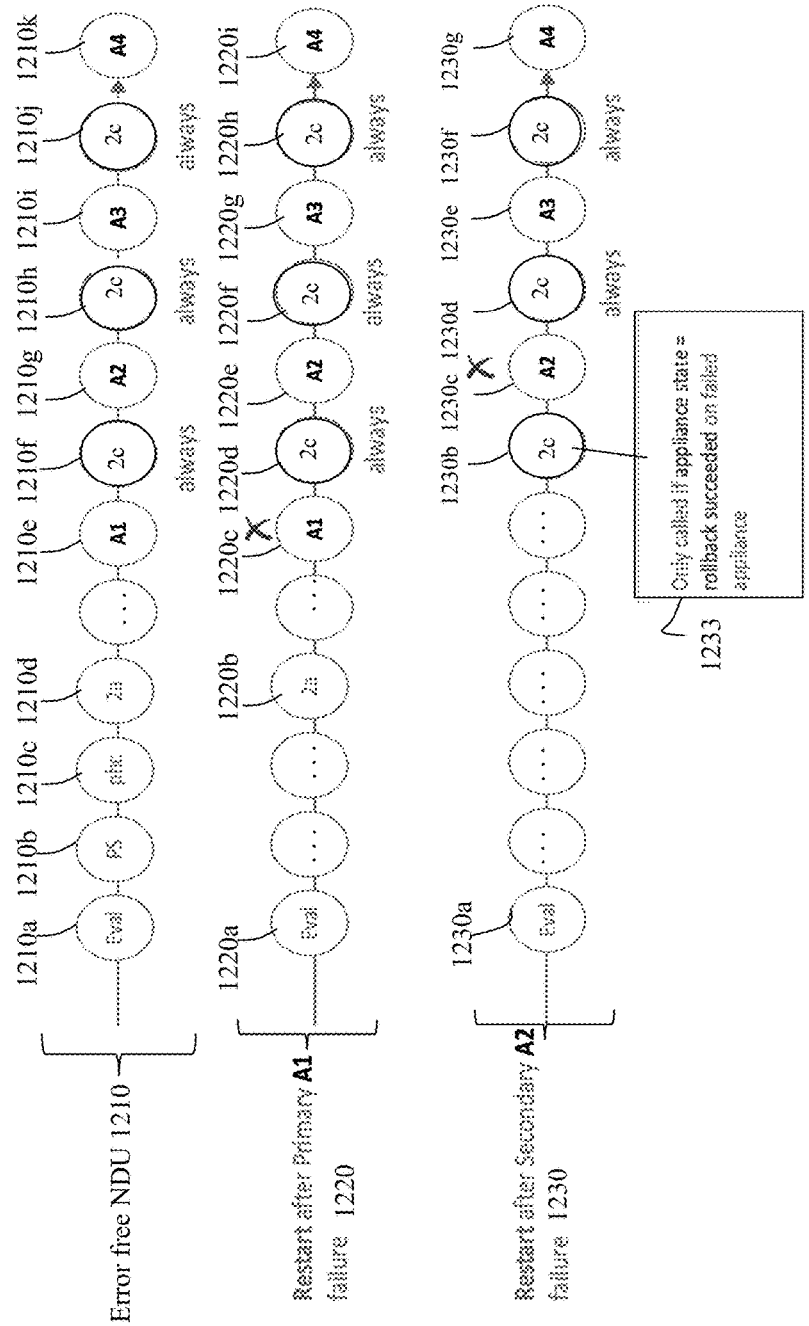
FIGS. 10 and 11 illustrate various scenarios of upgrade workflows, associated states and integration points in at least one embodiment in accordance with the techniques of the present disclosure.

Referring to FIG. 10, shown is an example 1200 of various upgrade workflow processing scenarios and associated upgrade states and IPs in at least one embodiment in accordance with the techniques of the present disclosure.

The example 1210 illustrates various upgrade states and IPs in connection with an error-free cluster upgrade in at least one embodiment in accordance with the techniques of the present disclosure. The example 1210, as well as 1220 and 1230, generally illustrate only a portion of the possible IPs and associated upgrade workflow states for simplicity.

In the example 1210, the upgrade workflow can transition between workflow processing points and corresponding IPs in the sequential order 1210a-k discussed in more detail below and as illustrated in the left to right processing order. The foregoing order corresponds to the state machine and associated workflow processing described in connection with FIG. 6.

In the example error-free cluster upgrade workflow 1210, eval 1210a denotes a first workflow processing point and upgrade state. Eval 1210a can denote processing performed to evaluate the state of the cluster. Eval processing can include, for example, determining how many appliances are in the cluster, reading persisted upgrade state information indicating whether the upgrade workflow processing is being invoked in connection with restarting from a prior failed appliance upgrade with an associated state, and the like. Eval 1210a can denote processing performed prior to commencing the upgrade workflow and associated states as in FIG. 6.

PS 1210b can denote prestage processing 330. PHC 1210c can denote PUHC processing 332. Element 1210d can denote IP 2A resulting in invoking the callbacks, if any, associated with IP 2A.

Element 1210*e* denotes the upgrade of the primary appliance A1 335. Element 1210*f* denotes the IP 2C where callbacks thereof are invoked and executed with respect to the secondary appliance A2 336 prior to upgrading A2 as denoted in the element 1210*g*. Element 1210*h* denotes the IP 2C where callbacks thereof are invoked and executed with respect to the secondary appliance A3 337 prior to upgrading A3 as denoted in the element 1210*i*. Element 1210*j* denotes the IP 2C where callbacks thereof are invoked and executed with respect to the secondary appliance A4 338 prior to upgrading A4 as denoted in the element 1210*k*.

In the example 1220, the upgrade workflow can transition between workflow processing points and corresponding IPs in the following sequential order 1220*a*-*i* discussed in more detail below and illustrated with the left to right workflow illustrated. The foregoing order corresponds to the state machine and associated workflow processing described in connection with FIG. 6.

The example 1220 illustrates various upgrade states and IPs in connection with an upgrade failure on the primary appliance A1 and then restarting the upgrade after the A1 upgrade failure in at least one embodiment. The upgrade workflow can execute processing associated with eval 1220*a*, IP 2A 1220*b* and upgrading A1 1220*c* where the A1 upgrade 1220*c* fails resulting in failing and stopping the cluster upgrade workflow processing. At a later point in time, the upgrade workflow processing is resumed in connection with restarting the cluster upgrade from the prior point of the A1 upgrade failure. In this case, restarting can commence with successfully upgrading A1 1220*c* prior to proceeding to invoke the callbacks of IP 2C 1220*d* with respect to the secondary appliance A2 336 prior to upgrading A2 (1220*e*). Element 1220*f* denotes the IP 2C where callbacks thereof are invoked and executed with respect to the secondary appliance A3 337 prior to upgrading A3 as denoted by the element 1220*g*. Element 1220*h* denotes the IP 2C where callbacks thereof are invoked and executed with respect to the secondary appliance A4 338 prior to upgrading A4 as denoted by the element 1220*i*.

In the example 1230, the upgrade workflow can transition between workflow processing points and corresponding IPs in the following sequential order 1230*a*-*j* discussed in more detail below and in the left to right order illustrated in the workflow 1230. The foregoing order corresponds to the state machine and associated workflow processing described in connection with FIG. 6.

The example 1230 illustrates various upgrade states and IPs in connection with an upgrade failure on the secondary appliance A2 and then restarting the upgrade after the A2 upgrade failure in at least one embodiment. The upgrade workflow can execute processing associated with eval 1230*a*, IP 2C 1230*b* and upgrading secondary appliance A2 1230*c* where the A2 upgrade 1230*c* fails resulting in failing and stopping the cluster upgrade workflow processing. At a later point in time, the upgrade workflow processing is resumed in connection with restarting the cluster upgrade from the prior point of the A2 upgrade failure. On upgrade restart in connection with 1230 subsequent to the A2 upgrade failure 1230*c*, the prepare IP 2C is called for the failed secondary appliance A2 if the appliance state of A2 on restart is rollback succeeded. Thus as denoted by 1233, IP 2C and its callbacks are only invoked for A2 if the prior rollback of A2 succeeded (e.g., where A2 is the failed upgraded appliance that was rolled back prior to the restart). As illustrated in 1230 on upgrade restart after A2 upgrade failure, the restart includes performing the upgrade workflow processing that can invoke IP 2C for the failed appliance A2 if the appliance state of A2 on restart is rollback succeeded, and then proceeds to call the IP 2C again before each remaining secondary appliances A3 and A4 is upgraded. In this case, restarting of 1230 can commence with invoking IP 2C 1230*b* (as noted above), successfully upgrading A2 1230*c* prior to proceeding to invoke the callbacks of IP 2C 1230*d* with respect to the secondary appliance A3 337 prior to upgrading A3 (1230*e*). Element 1230*f* denotes the IP 2C where callbacks thereof are invoked and executed with respect to the secondary appliance A4 338 prior to upgrading A4 as denoted by the element 1230*g*.

On upgrade restart as denoted by 1230, the IP 2B and callbacks thereof are invoked for the failed secondary appliance, if the state of the failed appliance A2 is rollback failed (e.g., rolling back the upgrade of A2 fails) or upgrade failed (e.g., A2 upgrade failure occurred outside of A2 rollback window so no rollback attempt of A2 is possible), the upgrade restart commences with upgrading A2 while omitting execution of IP 2C and its callbacks with respect to A2.

In at least one embodiment including the IP 2C and IP 2D as in FIG. 6, an upgrade failure occurring in the cluster rollback window 350 can result in rolling back the cluster as discussed in more detail elsewhere herein in connection with FIG. 3.

Figure 11:
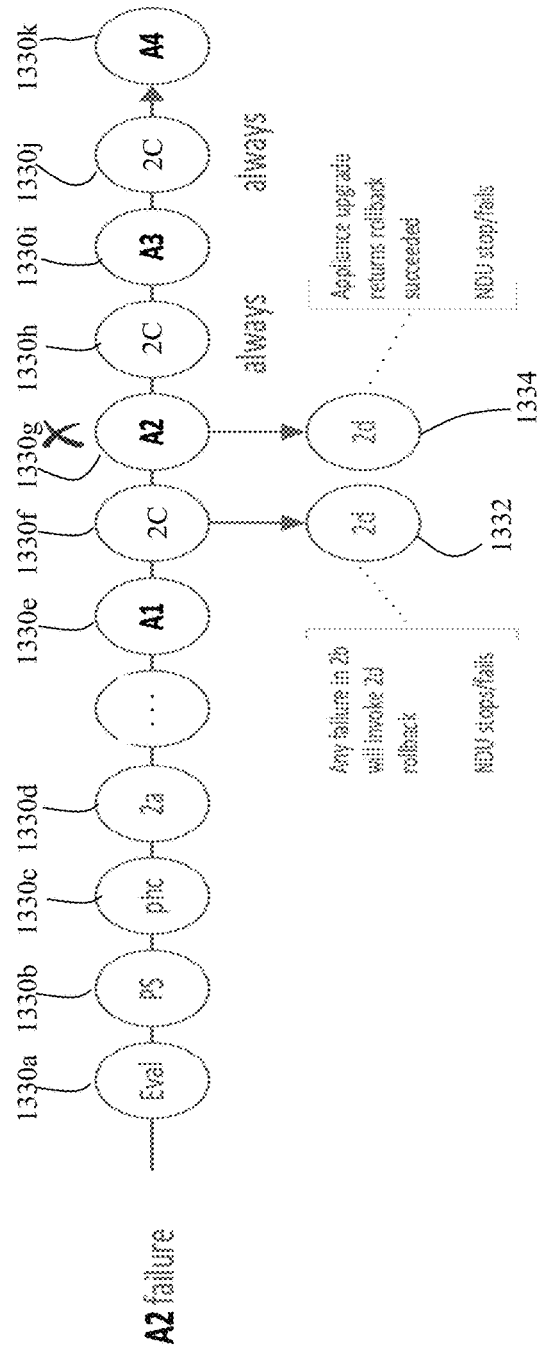

Referring to FIG. 11, shown is an example 1300 of illustrating an upgrade workflow processing scenario and associated upgrade states and IPs in at least one embodiment in accordance with the techniques of the present disclosure.

In the example 1300, the upgrade workflow can transition between workflow processing points and corresponding IPs in the following consecutive sequential order 1330*a*-*k* discussed in more detail below. The foregoing order corresponds to the state machine and associated workflow processing described in connection with FIG. 6.

The example 1300 includes and illustrates use of both the preparation IP 2C and rollback IP 2D in at least one embodiment.

In the example 1300, eval 1330*a* denotes a first workflow processing point and upgrade state. Eval 1330*a* can denote processing performed to evaluate the state of the cluster as noted above (e.g., element 1210*a*). PS 1330*b* can denote prestage processing 330. PHC 1330*c* can denote PUHC processing 332. Element 1330*d* can denote IP 2A resulting in invoking the callbacks, if any, associated with IP 2A.

Element 1330*e* denotes the upgrade of the primary appliance A1 335. Element 1330*f* denotes the IP 2C where callbacks thereof are invoked and executed with respect to the secondary appliance A2 336 prior to upgrading A2 as denoted in the element 1330*g*. Any failure in connection with executing callbacks of IP 2C 1330*f* for A2 results in rolling back A2. If the foregoing A2 rollback is successful, workflow processing can invoke rollback callbacks associated with IP 2D 1332 for A2 (as denoted by 1332), and then upgrade workflow processing stops or fails (and can be subsequently restarted). If the IP 2C callbacks 1330*f* executing with respect to A2 succeed, A2 is then upgraded 1330*g*. If the A2 upgrade 1330*g* fails within A2's rollback window 322*b*, A2 can be rolled back to the prior version (e.g., pre-upgrade version). If the foregoing A2 rollback succeeds, the IP 2D callbacks 1334 are executed with respect to A2, and then the upgrade workflow processing stops or fails (and can be subsequently restarted).

If the A2 upgrade 1330*g* is successful, workflow processing continues with element 1330*h* where the IP 2C where callbacks thereof are invoked and executed with respect to the secondary appliance A3 337 prior to upgrading A3 as denoted in the element 1330. Element 1330*j* denotes the IP 2C where callbacks thereof are invoked and executed with respect to the secondary appliance A4 338 prior to upgrading A4 as denoted in the element 1330k.

Although the IP 2D is illustrated with respect to only the secondary appliance A2, more generally, the IP 2D and its associated states 1332, 1334 can similarly be performed conditionally with respect to each of the secondary appliances depending on the particular upgrade workflow processing scenario.

Figure 12:
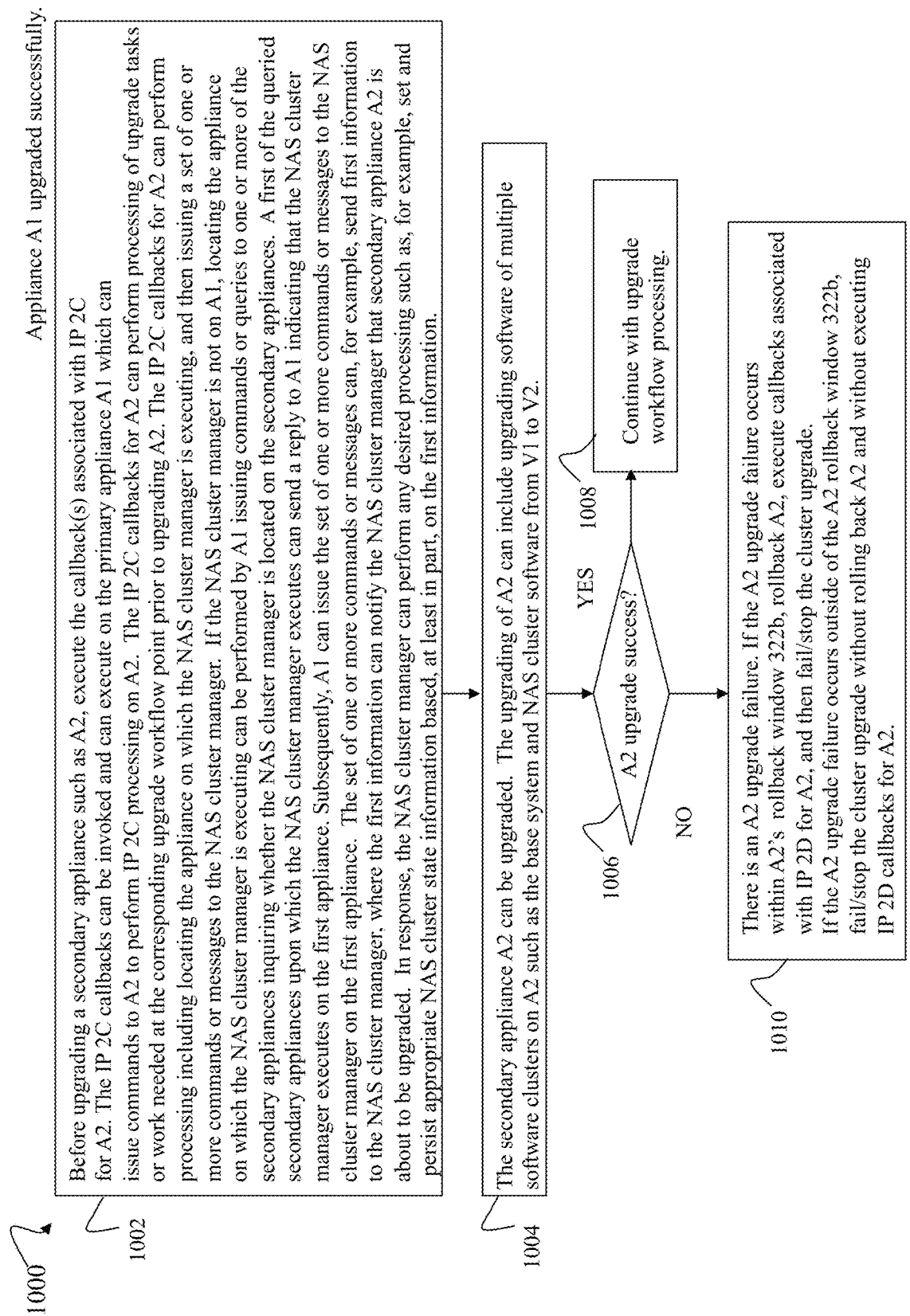

Referring to FIG. 12, shown is a flowchart 1000 of processing steps that can be performed in at least one embodiment in accordance with the techniques of the present disclosure. The flowchart 1000 includes processing that can generally be performed with respect to a secondary appliance, such as any of the appliances 336-338, although the flowchart 1000 is described for illustration with respect to the secondary appliance A2 336.

The processing of the flowchart 1000 can be performed subsequent to upgrading the primary appliance A1 335 in the upgrade workflow as described in connection with FIG. 6 and elsewhere herein. At the step 1002, before upgrading a secondary appliance such as A2, processing can execute callback(s) associated with IP 2C for A2. The IP 2C callbacks can be invoked and can execute on the primary appliance A1, where A1 can issue commands to A2 to perform IP 2C processing on A2. The IP 2C callbacks for A2 can perform processing including locating the appliance on which the NAS cluster manager is executing, and then issuing a set of one or more commands or messages to the NAS cluster manager. If the NAS cluster manager is not on A1, locating the appliance on which the NAS cluster manager is executing can be performed by A1 issuing commands or queries to one or more of the secondary appliances inquiring whether the NAS cluster manager is located on the secondary appliances. A first of the queried secondary appliances upon which the NAS cluster manager executes can send a reply to A1 indicating that the NAS cluster manager executes on the first appliance. Subsequently, A1 can issue the set of one or more commands or messages to the NAS cluster manager on the first appliance. The set of one or more commands or messages can, for example, send first information to the NAS cluster manager, where the first information can notify the NAS cluster manager that secondary appliance A2 is about to be upgraded. In response, the NAS cluster manager can perform any desired processing such as, for example, set and persist appropriate NAS cluster state information based, at least in part, on the first information. From the step 1002, control proceeds to the step 1004.

At the step 1004, the secondary appliance A2 can be upgraded. The upgrading of A2 can include upgrading software of multiple software clusters on A2 such as the base system and NAS cluster software from V1 to V2. From the step 1004, control proceeds to the step 1006.

At the step 1006, a determination is made as to whether the A2 upgrade of the step 1004 was successful. In at least one embodiment, the A2 upgrade of software of the multiple software clusters can be deemed successful if the A2 upgrade is successful with respect to all upgraded software clusters; and otherwise the A2 upgrade state can be deemed a failure or unsuccessful.

If the step 1006 evaluates to true or yes where the A2 upgrade state is successful, control proceeds to the step 1008 to continue with upgrade workflow processing.

If the step 1006 evaluates to no or false where the A2 upgrade state is failure or unsuccessful, control proceeds to the step 1010.

At the step 1010, further processing can be performed in connection with the A2 upgrade failure. If the A2 upgrade failure occurred within the appliance A2's rollback window 322b, processing can be performed to rollback A2, execute callback(s) associated with IP 2D for A2, and then fail or stop the cluster upgrade and associated workflow processing. Alternatively, if the A2 upgrade failure occurred outside of the appliance A2's rollback window 322b, processing can be performed to fail or stop the cluster upgrade and associated workflow processing without rolling back A2 and without executing the IP 2D callbacks for A2. In at least one embodiment, rolling back A2 can include rolling back software of the multiple clusters on the first node of A2 that failed the upgrade in A2's rollback window. For example, rolling back A2 can include rolling back software of the base system and NAS clusters of A2 from V2 to V1.

Referring to FIG. 13, shown is a flowchart 1100 of processing steps that can be performed in at least one embodiment in accordance with the techniques of the present disclosure. The flowchart 1100 provides further detail regarding processing performed in connection with IP 2D for appliance A2 such as in connection with the step 1010 of FIG. 12 in an embodiment where the multiple software clusters include at least the base system cluster and the NAS cluster.

At the step 1102, the appliance A2 rollback succeeds. As noted above, A2 rollback can include rolling back versions of multiple software clusters including the base system and NAS cluster software on A2 from V2 to V1.

From the step 1102, control proceeds to the step 1104. At the step 1104, after a successful A2 rollback, processing can be performed to execute callback(s) associated with IP 2D for A2. IP 2D callbacks can be invoked and can execute on the primary appliance A1, where A1 can issue commands to A2 to perform IP 2D processing on A2. The IP 2D callbacks for A2 can perform processing including locating the appliance on which the NAS cluster manager is executing, and then issuing a set of one or more commands or messages to the NAS cluster manager. If the NAS cluster manager is not on A1, locating the appliance on which the NAS cluster manager is executing can be performed by A1 issuing commands or queries to one or more of the secondary appliances inquiring whether the NAS cluster manager is located on the secondary appliances. A first of the queried secondary appliances upon which the NAS cluster manager executes can send a reply to A1 indicating that the NAS cluster manager executes on the first appliance. Subsequently, A1 can issue the set of one or more commands or messages to the NAS cluster manager on the first appliance. The set of one or more commands or messages can, for example, send first information to the NAS cluster manager, where the first information can notify the NAS cluster manager that secondary appliance A2 has been successfully rolled back. In response, the NAS cluster manager can perform any desired processing such as, for example, set and persist appropriate NAS cluster state information based, at least in part, on the first information.

In at least one embodiment, an IP 2D callback for A2 can include sending a first request to the NAS cluster manager to prepare for a NAS cluster rollback due to the A2 rollback. In response to the first request, the NAS cluster manager can: set the NAS cluster into a NAS cluster rollback mode; restore VDMs from the second node of A2 back to the rolled back first node of A2 (e.g., these VDMs were previously moved from the first node to the second node of A2 when the upgrade to the first node of A2 started, and now the VDMs are restored to the first node from the second node to restore node-level load balance); and restrict or limit NAS requests/operations performed on A2 (e.g., reject any NAS requests/operations unrelated to rollback tasks or work).

In the step 1102, after sending the first request, the IP 2D callback for A2 can also include: sending a second request to the NAS cluster manager to stop the NAS application on the first node of A2 that rolled back; and sending a third request to the NAS cluster manager to restart the NAS application on the first node of A2 in the prior V1 version of NAS cluster software (e.g., where V1 is the rolled back version). In at least one embodiment, the NAS application can include the restored VDMs or file servers.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
    defining a plurality of integration points, wherein each of the plurality of integration points is associated with one of a first plurality of workflow processing points included in an upgrade workflow, wherein the upgrade workflow includes a second plurality of workflow processing points comprising the first plurality of workflow processing points;
    associating a first code entity with a first of the plurality of integration points; and
    performing first processing that executes the upgrade workflow to upgrade a plurality of storage appliances, wherein a first software cluster of components is installed on the plurality of storage appliances and wherein a second software cluster of components is installed on the plurality of storage appliances, wherein upgrading the plurality of storage appliances by the first processing includes upgrading the first software cluster of components installed on the plurality of storage appliances from a first current version to a first new version, and upgrading the second software cluster of components installed on the plurality of appliances from a second current version to a second new version, wherein the first processing further includes:
        prior to upgrading a first of the plurality of storage appliances, executing first code corresponding to the first integration point;
        in response to executing the first code corresponding to the first integration point, invoking the first code entity associated with the first integration point, wherein said first code entity performs at least a first task in connection with the second cluster software prior to upgrading the first storage appliance; and
        performing said upgrading the first storage appliance including upgrading a first component of the first software cluster from the first current version to the first new version and upgrading a second component of the second software cluster from the second current version to the second new version, wherein the first component and the second component are installed on the first storage appliance.

2. The computer-implemented method of claim 1, wherein the first software cluster is a base system software cluster, and wherein the second software cluster is a NAS (network attached storage) software cluster.

3. The computer-implemented method of claim 2, wherein the second component of the NAS software cluster is a first file server.

4. The computer-implemented method of claim 1, wherein the first component of the base system software cluster performs block storage services used by the first file server of the NAS software cluster.

5. The computer-implemented method of claim 2, wherein the NAS software cluster includes a NAS cluster manager executing on a second of the plurality of storage appliances and wherein the base system software cluster includes a base system cluster manager executing on a third of the plurality of storage appliances.

6. The computer-implemented method of claim 5, wherein the first task performed by the first code entity at the first integration point prior to upgrading the first storage appliance includes determining which of the plurality of storage appliances includes the NAS cluster manager executing thereon.

7. The computer-implemented method of claim 6, wherein said determining which of the plurality of storage appliances includes the NAS cluster manager executing thereon comprises:
    the base system cluster manager querying one or more of the plurality of storage appliances as to whether the NAS cluster manager is executing on the one or more storage appliances, wherein the one or more storage appliances queried includes the second storage appliance; and
    the second storage appliance sending a first response to the base system cluster manager indicating that the NAS cluster manager is executing on the second storage appliance.

8. The computer-implemented method of claim 7, wherein the first task performed by the first code entity at the first integration point prior to upgrading the first storage appliance further includes:
    subsequent to receiving the first response, the base system cluster manager sending a notification to the NAS cluster manager that the first storage appliance is about to be upgraded.

9. The computer-implemented method of claim 1, further comprising:
    associating a second code entity with a second of the plurality of integration points, wherein said second code entity performs storage appliance rollback processing.

10. The computer-implemented method of claim 9, wherein the method includes:
    said upgrading the first storage appliance resulting in an appliance upgrade failure within a first defined rollback window of the first storage appliance;
    responsive to the appliance upgrade failure of the first storage appliance, executing second code corresponding to second integration point to rollback the first component of the first software cluster installed on the first storage appliance from the first new version to the first current version and to rollback the second component of the second software cluster installed on the first storage appliance from the second new version to the second current version; and in response to executing the second code corresponding to the second integration point, invoking the second code entity associated with the second integration point, wherein said second code entity performs at least a second task in connection with the second cluster software due to the appliance upgrade failure of the first storage appliance.

11. The computer-implemented method of claim 10, wherein the second software cluster includes a second cluster manager executing on a second of the plurality of storage appliances, and wherein the first software cluster includes a first cluster manager executing on a third of the plurality of storage appliances.

12. The computer-implemented method of claim 11, wherein the second task that is performed by the second code entity at the second integration point in response to the appliance upgrade failure of the first storage appliance within the first defined rollback window of the first storage appliance further includes determining which of the plurality of storage appliances includes the second cluster manager executing thereon.

13. The computer-implemented method of claim 12, wherein said determining which of the plurality of storage appliances includes the second cluster manager executing thereon comprises:

the first cluster manager querying one or more of the plurality of storage appliances as to whether the second cluster manager is executing on the one or more storage appliances, wherein the one or more storage appliances queried includes the second storage appliance; and the second storage appliance sending a first response to the first cluster manager indicating that the second cluster manager is executing on the second storage appliance.

14. The computer-implemented method of claim 13, wherein the second task performed by the second code entity at the second integration point in response to the appliance upgrade failure of the first storage appliance within the first defined rollback window of the first storage appliance further includes:

subsequent to receiving the first response, the first cluster manager sending a notification to the second cluster manager regarding the appliance upgrade failure of the first storage appliance.

15. The computer-implemented method of claim 14, wherein the second software cluster is a NAS software cluster, wherein the second cluster manager is a NAS cluster manager, and further comprising, in response to the NAS cluster manager receiving the notification regarding the appliance upgrade failure of the first storage appliance, performing second processing comprising:

the NAS cluster manager setting the NAS software cluster into a NAS cluster rollback mode; and restoring one or more file servers from a first processor node of the first storage appliance to a second processor node of the first storage appliance, wherein during said upgrading the first storage appliance, the one or more file servers were previously moved from the second processor node to the first processor node prior to upgrading the second processor node of the first storage appliance, and wherein said upgrading the first storage system failed prior to commencing upgrading of the first processor node.

16. The computer-implemented method of claim 15, wherein the second task performed by the second code entity at the second integration point in response to the appliance upgrade failure of the first storage appliance within the first defined rollback window of the first storage appliance further includes:

the first cluster manager sending a request to the second cluster manager to restart the one or more file servers on the second node of the first storage appliance in the second current version corresponding to a version of the NAS software cluster as prior to said upgrading the first storage appliance.

17. The computer-implemented method of claim 1, wherein said associating specifies execution or runtime linkages between the first code entity and the first integration point, wherein the first code entity is a user-provided code entity, wherein the first code entity, which corresponds to the first integration point, is a callback routine or code module invoked in said first processing by the first executable code of an upgrade infrastructure in response to the first executable code of the upgrade infrastructure reaching said first integration point during the first processing.

18. The computer-implemented method of claim 1, wherein the plurality of storage appliances includes a primary appliance and two or more secondary appliances, wherein the first storage appliance is one of the two or more secondary appliances, and wherein the first code corresponding to the first integration point is invoked for each of the two or more secondary appliances prior to upgrading said each secondary appliance.

19. A system comprising:
one or more processors; and
a memory comprising code stored thereon that, when executed by at least a first of the one or more processors, performs a method comprising:

defining a plurality of integration points, wherein each of the plurality of integration points is associated with one of a first plurality of workflow processing points included in an upgrade workflow, wherein the upgrade workflow includes a second plurality of workflow processing points comprising the first plurality of workflow processing points;

associating a first code entity with a first of the plurality of integration points; and performing first processing that executes the upgrade workflow to upgrade a plurality of storage appliances, wherein a first software cluster of components is installed on the plurality of storage appliances and wherein a second software cluster of components is installed on the plurality of storage appliances, wherein upgrading the plurality of storage appliances by the first processing includes upgrading the first software cluster of components installed on the plurality of storage appliances from a first current version to a first new version, and upgrading the second software cluster of components installed on the plurality of appliances from a second current version to a second new version, wherein the first processing further includes:

prior to upgrading a first of the plurality of storage appliances, executing first code corresponding to the first integration point;

in response to executing the first code corresponding to the first integration point, invoking the first code entity associated with the first integration point, wherein said first code entity performs at least a first task in connection with the second cluster software prior to upgrading the first storage appliance; and performing said upgrading the first storage appliance including upgrading a first component of the first software cluster from the first current version to the first new version and upgrading a second component of the second software cluster from the second current version to the second new version, wherein the first component and the second component are installed on the first storage appliance.

20. One or more non-transitory computer readable media comprising code stored thereon that, when executed by a processor, performs a method comprising:

defining a plurality of integration points, wherein each of the plurality of integration points is associated with one of a first plurality of workflow processing points included in an upgrade workflow, wherein the upgrade workflow includes a second plurality of workflow processing points comprising the first plurality of workflow processing points;

associating a first code entity with a first of the plurality of integration points; and performing first processing that executes the upgrade workflow to upgrade a plurality of storage appliances, wherein a first software cluster of components is installed on the plurality of storage appliances and wherein a second software cluster of components is installed on the plurality of storage appliances, wherein upgrading the plurality of storage appliances by the first processing includes upgrading the first software cluster of components installed on the plurality of storage appliances from a first current version to a first new version, and upgrading the second software cluster of components installed on the plurality of appliances from a second current version to a second new version, wherein the first processing further includes:

prior to upgrading a first of the plurality of storage appliances, executing first code corresponding to the first integration point;

in response to executing the first code corresponding to the first integration point, invoking the first code entity associated with the first integration point, wherein said first code entity performs at least a first task in connection with the second cluster software prior to upgrading the first storage appliance; and performing said upgrading the first storage appliance including upgrading a first component of the first software cluster from the first current version to the first new version and upgrading a second component of the second software cluster from the second current version to the second new version, wherein the first component and the second component are installed on the first storage appliance.

* * * * *